United States Patent
Yokohata

(10) Patent No.: US 9,026,382 B2
(45) Date of Patent: May 5, 2015

(54) FLOW RATE MEASUREMENT DEVICE

(75) Inventor: Mitsuo Yokohata, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 550 days.

(21) Appl. No.: 13/505,619

(22) PCT Filed: Nov. 2, 2010

(86) PCT No.: PCT/JP2010/006462
§ 371 (c)(1),
(2), (4) Date: May 2, 2012

(87) PCT Pub. No.: WO2011/052240
PCT Pub. Date: May 5, 2011

(65) Prior Publication Data
US 2012/0221259 A1   Aug. 30, 2012

(30) Foreign Application Priority Data

Nov. 2, 2009 (JP) .................................. 2009-251699

(51) Int. Cl.
*G06F 19/00*  (2011.01)
*G01F 1/00*   (2006.01)
*G01F 15/075* (2006.01)
(Continued)

(52) U.S. Cl.
CPC .......... *G01F 15/0755* (2013.01); *G01F 15/046* (2013.01); *G01F 15/00* (2013.01)

(58) Field of Classification Search
CPC ... G01F 15/0755; G01F 15/00; G01F 15/046; G01F 1/66; G01F 25/0053

USPC ............................................. 702/45, 50, 100
See application file for complete search history.

(56) References Cited

U.S. PATENT DOCUMENTS 7,809,514 B2   10/2010   Miyata et al.
2009/0018782 A1   1/2009   Sameda et al.
(Continued)

FOREIGN PATENT DOCUMENTS

EP   2 077 439 A1   7/2009
JP   2000-227348 A   8/2000
(Continued)

OTHER PUBLICATIONS

International Search Report for International Application No. PCT/JP2010/006462, dated Jan. 25, 2011, 1 page.
(Continued)

*Primary Examiner* — John H Le
(74) *Attorney, Agent, or Firm* — Brinks Gilson & Lione

(57) ABSTRACT

A problem of the present invention is to provide a flow rate measurement device which is capable of simplifying calculation, reducing the amount of memory necessary for calculation, absorbing variations resulting from manual operation or ignition state when appliances are used alone or in combination, and improving appliance identification precision with a configuration which extracts characteristics of appliances. The flow rate measurement device monitors and determines the change in a flow rate measured by a flow rate measurement unit, monitors and determines the code obtained by differential conversion unit, extracts appliance characteristic flow rates representing the characteristics of the gas appliances, and compares them with the appliance-specific characteristics, thereby identifying the gas appliances.

9 Claims, 20 Drawing Sheets

(51) Int. Cl.
*G01F 15/04* (2006.01)
*G01F 15/00* (2006.01)

(56) References Cited

U.S. PATENT DOCUMENTS

| | | |
|---|---|---|
| 2009/0271128 A1 | 10/2009 | Umekage et al. |
| 2010/0292940 A1* | 11/2010 | Iwamoto .................. 702/45 |
| 2011/0178732 A1 | 7/2011 | Iwamoto |
| 2011/0231115 A1 | 9/2011 | Sameda et al. |

FOREIGN PATENT DOCUMENTS

| | | |
|---|---|---|
| JP | 2006-313114 A | 11/2006 |
| JP | 2008-309498 A | 12/2008 |
| JP | 2009-075015 A | 4/2009 |

OTHER PUBLICATIONS

Extended European Search Report in corresponding European Application No. 10826375.7, dated Jan. 7, 2015, 6 pages.

* cited by examiner

*FIG. 2*

| ABSOLUTE FLOW RATE Q(n) | DIFFERENTIAL FLOW RATE ΔQ | CODE |
|---|---|---|
| Q(n) ≠ 0 | 400 < \|Q(n)\| | F |
| | 300 < \|Q(n)\| ≦ 400 | E |
| | 250 < \|Q(n)\| ≦ 300 | D |
| | 200 < \|Q(n)\| ≦ 250 | C |
| | 175 < \|Q(n)\| ≦ 200 | B |
| | 150 < \|Q(n)\| ≦ 175 | A |
| | 125 < \|Q(n)\| ≦ 150 | 9 |
| | 100 < \|Q(n)\| ≦ 125 | 8 |
| | 75 < \|Q(n)\| ≦ 100 | 7 |
| | 50 < \|Q(n)\| ≦ 75 | 6 |
| | 40 < \|Q(n)\| ≦ 50 | 5 |
| | 30 < \|Q(n)\| ≦ 40 | 4 |
| | 20 < \|Q(n)\| ≦ 30 | 3 |
| | 10 < \|Q(n)\| ≦ 20 | 2 |
| | \|Q(n)\| ≦ 10 | 1 |
| Q(n) = 0 | FLOW RATE: ZERO | 0 |

FIG. 4
(a)
| TIME | FLOW RATE Q(n) | DIFFERENTIAL ΔQ | CODE |
|---|---|---|---|
| 1 | 0 | 0 | 0 |
| 2 | 90 | 90 | 7 |
| 3 | 95 | 5 | 1 |
| 4 | 103 | 8 | 1 |
| 5 | 153 | 50 | 5 |
| 6 | 203 | 50 | 5 |
| 7 | 203 | 0 | 1 |
| 8 | 204 | 1 | 1 |
| 9 | 204 | 0 | 1 |
| 10 | 204 | 0 | 1 |
| 11 | 204 | 0 | 1 |
| 12 | 204 | 0 | 1 |
| 13 | 203 | 0 | 1 |
| 14 | 203 | -1 | 1 |
| 15 | 204 | 1 | 1 |
| 16 | 204 | 0 | 1 |
} INTERMEDIATE STABLE FLOW RATE COVERAGE
} STABLE FLOW RATE COVERAGE
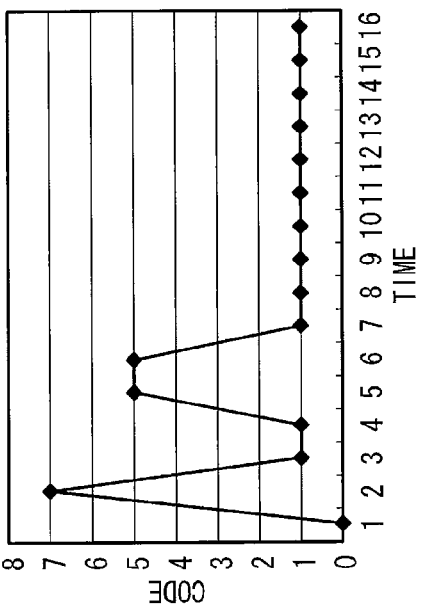
(c) CODE
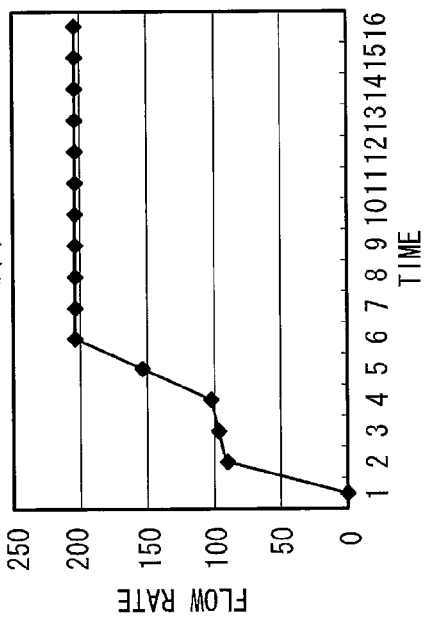
(b) Q(n)

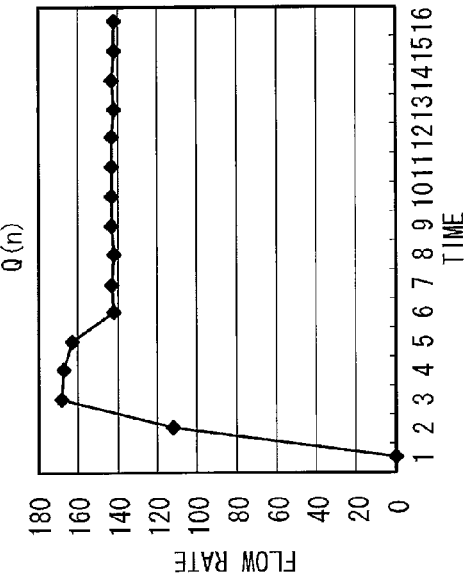
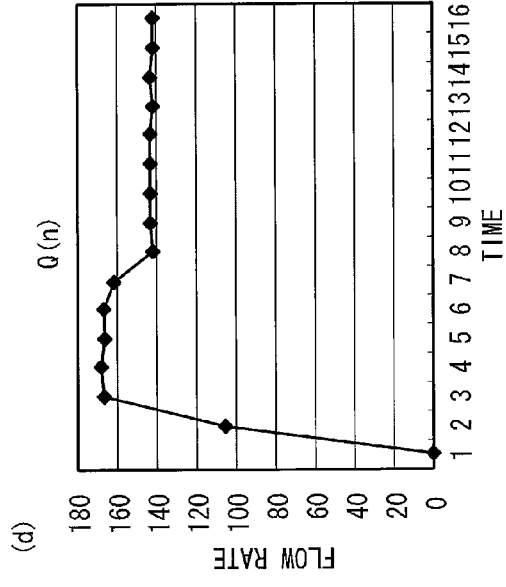
FIG. 5

(a)

| TIME | FLOW RATE Q(n) | TIME | FLOW RATE Q(n) | TIME | FLOW RATE Q(n) | TIME | FLOW RATE Q(n) | TIME | FLOW RATE Q(n) |
|---|---|---|---|---|---|---|---|---|---|
| 1 | 0 | 16 | 66 | 31 | 150 | 46 | 216 | 61 | 300 |
| 2 | 0 | 17 | 72 | 32 | 150 | 47 | 222 | 62 | 300 |
| 3 | 0 | 18 | 78 | 33 | 150 | 48 | 228 | 63 | 300 |
| 4 | 0 | 19 | 84 | 34 | 150 | 49 | 234 | 64 | 300 |
| 5 | 0 | 20 | 90 | 35 | 150 | 50 | 240 | 65 | 300 |
| 6 | 6 | 21 | 96 | 36 | 156 | 51 | 246 | 66 | 300 |
| 7 | 12 | 22 | 102 | 37 | 162 | 52 | 252 | 67 | 300 |
| 8 | 18 | 23 | 108 | 38 | 168 | 53 | 258 | 68 | 300 |
| 9 | 24 | 24 | 114 | 39 | 174 | 54 | 264 | 69 | 300 |
| 10 | 30 | 25 | 120 | 40 | 180 | 55 | 270 | 70 | 300 |
| 11 | 36 | 26 | 126 | 41 | 186 | 56 | 276 | 71 | 300 |
| 12 | 42 | 27 | 132 | 42 | 192 | 57 | 282 | 72 | 300 |
| 13 | 48 | 28 | 138 | 43 | 198 | 58 | 288 | 73 | 300 |
| 14 | 54 | 29 | 144 | 44 | 204 | 59 | 294 | 74 | 300 |
| 15 | 60 | 30 | 150 | 45 | 210 | 60 | 300 | 75 | 300 |

(b)

FIG. 7
(a)
| TIME | MEASUREMENT 1 | | MEASUREMENT 2 | | MEASUREMENT 3 | | MEASUREMENT 4 | | MEASUREMENT 5 | |
|---|---|---|---|---|---|---|---|---|---|---|
| | FLOW RATE | RATIO | FLOW RATE | RATIO | FLOW RATE | RATIO | FLOW RATE | RATIO | FLOW RATE | RATIO |
| 1 | 0 | – | 0 | – | 0 | – | 0 | – | 0 | – |
| 2 | 6 | – | 12 | – | 18 | – | 24 | – | 30 | – |
| 3 | 36 | – | 42 | – | 48 | – | 54 | 125.0 | 60 | 100.0 |
| 4 | 66 | 83.3 | 72 | 71.4 | 78 | 62.5 | 84 | 55.6 | 90 | 50.0 |
| 5 | 96 | 45.5 | 102 | 41.7 | 108 | 38.5 | 114 | 35.7 | 120 | 33.3 |
| 6 | 126 | 31.3 | 132 | 29.4 | 138 | 27.8 | 144 | 26.3 | 150 | 25.0 |
| 7 | 150 | 19.0 | 150 | 13.6 | 150 | 8.7 | 150 | 4.2 | 150 | 0.0 |
| 8 | 156 | 4.0 | 162 | 8.0 | 168 | 12.0 | 174 | 16.0 | 180 | 20.0 |
| 9 | 186 | 19.2 | 192 | 18.5 | 198 | 17.9 | 204 | 17.2 | 210 | 16.7 |
| 10 | 216 | 16.1 | 222 | 15.6 | 228 | 15.2 | 234 | 14.7 | 240 | 14.3 |
| 11 | 246 | 13.9 | 252 | 13.5 | 258 | 13.2 | 264 | 12.8 | 270 | 12.5 |
| 12 | 276 | 12.2 | 282 | 11.9 | 288 | 11.6 | 294 | 11.4 | 300 | 11.1 |
| 13 | 300 | 8.7 | 300 | 6.4 | 300 | 4.2 | 300 | 2.0 | 300 | 0.0 |
| 14 | 300 | 0.0 | 300 | 0.0 | 300 | 0.0 | 300 | 0.0 | 300 | 0.0 |
| 15 | 300 | 0.0 | 300 | 0.0 | 300 | 0.0 | 300 | 0.0 | 300 | 0.0 |
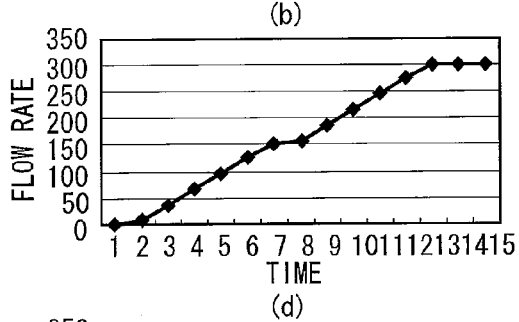
(b)
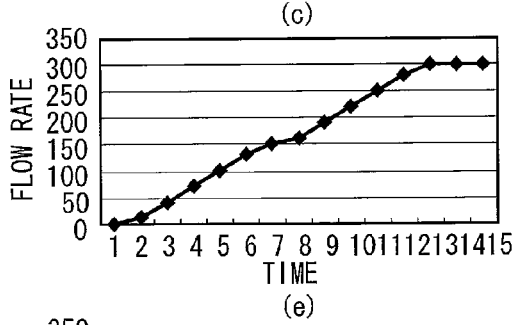
(c)
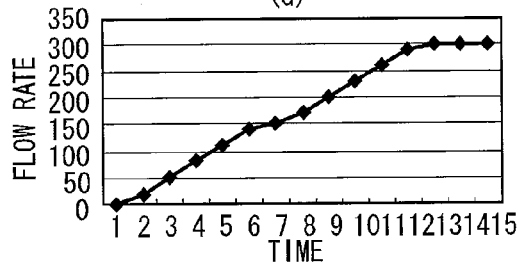
(d)
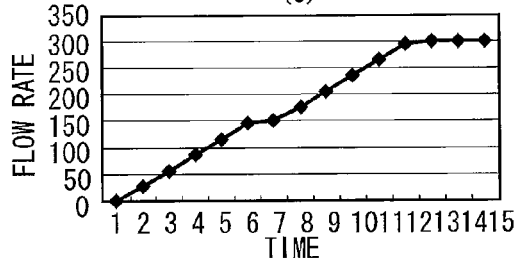
(e)
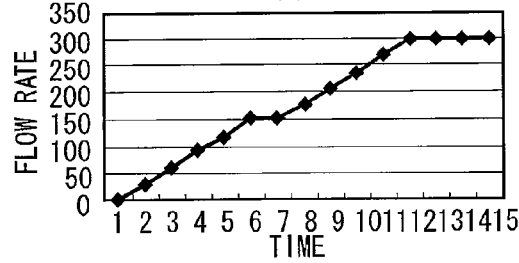
(f)

FIG. 8

| | TARGET FLOW RATE | | RATIO | INTERMEDIATE FLOW RATE |
|---|---|---|---|---|
| MEASUREMENT 1 | TIME 7 | 150 | 4.0 | 153.0 |
| | TIME 8 | 156 | | |
| MEASUREMENT 2 | TIME 6 | 132 | 13.6 | 141.0 |
| | TIME 7 | 150 | | |
| MEASUREMENT 3 | TIME 6 | 138 | 8.7 | 144.0 |
| | TIME 7 | 150 | | |
| MEASUREMENT 4 | TIME 6 | 144 | 4.2 | 147.0 |
| | TIME 7 | 150 | | |
| MEASUREMENT 5 | TIME 6 | 150 | 0.0 | 150.0 |
| | TIME 7 | 150 | | |

| TIME | MEASUREMENT 1 | | MEASUREMENT 2 | | MEASUREMENT 3 | | MEASUREMENT 4 | | MEASUREMENT 5 | |
|---|---|---|---|---|---|---|---|---|---|---|
| | FLOW RATE | RATIO | FLOW RATE | RATIO | FLOW RATE | RATIO | FLOW RATE | RATIO | FLOW RATE | RATIO |
| 1 | 0 | – | 0 | – | 0 | – | 0 | – | 0 | – |
| 2 | 6 | – | 12 | – | 18 | – | 24 | – | 30 | – |
| 3 | 36 | – | 42 | – | 48 | – | 54 | 125.0 | 60 | 100.0 |
| 4 | 66 | 83.3 | 72 | 71.4 | 78 | 62.5 | 84 | 55.6 | 90 | 50.0 |
| 5 | 96 | 45.5 | 102 | 41.7 | 108 | 38.5 | 114 | 35.7 | 120 | 33.3 |
| 6 | 126 | 31.3 | 132 | 29.4 | 138 | 27.8 | 144 | 26.3 | 150 | 25.0 |
| 7 | 150 | 19.0 | 150 | 13.6 | 150 | 8.7 | 150 | 4.2 | 150 | 0.0 |
| 8 | 156 | 4.0 | 162 | 8.0 | 168 | 12.0 | 174 | 16.0 | 180 | 20.0 |
| 9 | 186 | 19.2 | 192 | 18.5 | 198 | 17.9 | 204 | 17.2 | 210 | 16.7 |
| 10 | 216 | 16.1 | 222 | 15.6 | 228 | 15.2 | 234 | 14.7 | 240 | 14.3 |
| 11 | 246 | 13.9 | 252 | 13.5 | 258 | 13.2 | 264 | 12.8 | 270 | 12.5 |
| 12 | 276 | 12.2 | 282 | 11.9 | 288 | 11.6 | 294 | 11.4 | 300 | 11.1 |
| 13 | 300 | 8.7 | 300 | 6.4 | 300 | 4.2 | 300 | 2.0 | 300 | 0.0 |
| 14 | 300 | 0.0 | 300 | 0.0 | 300 | 0.0 | 300 | 0.0 | 300 | 0.0 |
| 15 | 300 | 0.0 | 300 | 0.0 | 300 | 0.0 | 300 | 0.0 | 300 | 0.0 |

(b)

| | TARGET FLOW RATE | | RATIO | INTERMEDIATE FLOW RATE |
|---|---|---|---|---|
| MEASUREMENT 1 | TIME 7 | 150 | 4.0 | 153.0 |
| | TIME 8 | 156 | | |
| MEASUREMENT 2 | TIME 7 | 150 | 8.0 | 156.0 |
| | TIME 8 | 162 | | |
| MEASUREMENT 3 | TIME 6 | 138 | 8.7 | 144.0 |
| | TIME 7 | 150 | | |
| MEASUREMENT 4 | TIME 6 | 144 | 4.2 | 147.0 |
| | TIME 7 | 150 | | |
| MEASUREMENT 5 | TIME 6 | 150 | 0.0 | 150.0 |
| | TIME 7 | 150 | | |

FIG. 11
(a)
| TIME | FLOW RATE Q(n) | DIFFERENTIAL ΔQ | RATIO | CODE |
|---|---|---|---|---|
| 1 | 0 | 0 | — | 0 |
| 2 | 112 | 112 | — | 8 |
| 3 | 168 | 56 | 50.0 | 6 |
| 4 | 167 | −1 | 0.6 | 1 |
| 5 | 141 | −26 | 15.6 | 1 |
| 6 | 141 | 0 | 0.0 | 3 |
| 7 | 143 | 2 | 1.4 | 1 |
| 8 | 142 | −1 | 0.7 | 1 |
| 9 | 143 | 1 | 0.7 | 1 |
| 10 | 143 | 0 | 0.0 | 1 |
| 11 | 143 | 0 | 0.0 | 1 |
| 12 | 143 | 0 | 0.0 | 1 |
| 13 | 142 | −1 | 0.7 | 1 |
| 14 | 143 | 1 | 0.7 | 1 |
| 15 | 142 | −1 | 0.7 | 1 |
| 16 | 142 | 0 | 0.0 | 1 |
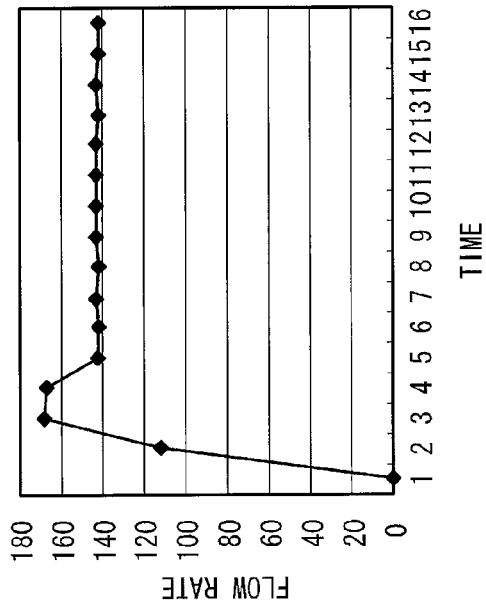
(b)
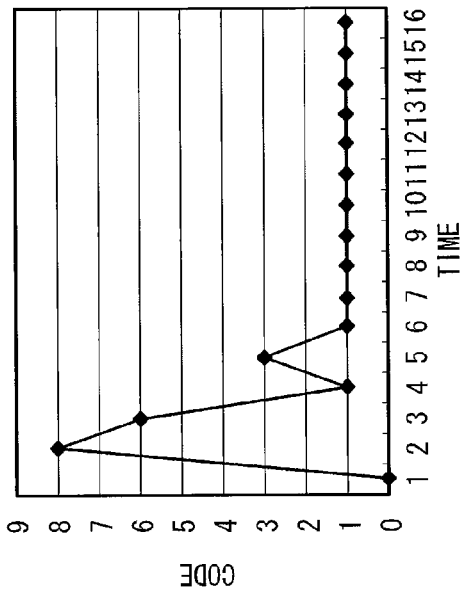
(c)
(d)
| APPLIANCE CHARACTERISTIC CODE SEQUENCE | 08131 |
|---|---|
| INTERMEDIATE FLOW RATE | 167.5 |
| INTERMEDIATE STABLE FLOW RATE | — |
| STABLE FLOW RATE | 142.25 |

| | | USED APPLIANCE | | | |
|---|---|---|---|---|---|
| | | CODE SEQUENCE | INTERMEDI-ATE FLOW RATE | INTERMEDI-ATE STABLE FLOW RATE | STABLE FLOW RATE |
| REGISTERED APPLIANCE | CODE SEQUENCE | COMPARISON | - | - | - |
| | INTERMEDIATE FLOW RATE | - | COMPARISON | - | - |
| | INTERMEDIATE STABLE FLOW RATE | - | - | COMPARISON | - |
| | STABLE FLOW RATE | - | - | - | COMPARISON |

(b)

| | | USED APPLIANCE | | | |
|---|---|---|---|---|---|
| | | CODE SEQUENCE | INTERMEDI-ATE FLOW RATE | INTERMEDI-ATE STABLE FLOW RATE:Y | STABLE FLOW RATE |
| REGISTERED APPLIANCE | CODE SEQUENCE | COMPARISON | - | - | - |
| | INTERMEDIATE FLOW RATE | - | COMPARISON | COMPARISON | - |
| | INTERMEDIATE STABLE FLOW RATE:N | - | - | - | - |
| | STABLE FLOW RATE | - | - | - | COMPARISON |

(c)

| | | USED APPLIANCE | | | |
|---|---|---|---|---|---|
| | | CODE SEQUENCE | INTERMEDI-ATE FLOW RATE | INTERMEDI-ATE STABLE FLOW RATE:N | STABLE FLOW RATE |
| REGISTERED APPLIANCE | CODE SEQUENCE | COMPARISON | - | - | - |
| | INTERMEDIATE FLOW RATE | - | COMPARISON | - | - |
| | INTERMEDIATE STABLE FLOW RATE:Y | - | COMPARISON | - | - |
| | STABLE FLOW RATE | - | - | - | COMPARISON |

| TIME | MEASUREMENT 1 | | MEASUREMENT 2 | | MEASUREMENT 3 | | MEASUREMENT 4 | | MEASUREMENT 5 | |
|---|---|---|---|---|---|---|---|---|---|---|
| | FLOW RATE | RATIO | FLOW RATE | RATIO | FLOW RATE | RATIO | FLOW RATE | RATIO | FLOW RATE | RATIO |
| 1 | 0 | – | 0 | – | 0 | – | 0 | – | 0 | – |
| 2 | 6 | – | 12 | – | 18 | – | 24 | – | 30 | – |
| 3 | 36 | 500.0 | 42 | 250.0 | 48 | 166.7 | 54 | 125.0 | 60 | 100.0 |
| 4 | 66 | 83.3 | 72 | 71.4 | 78 | 62.5 | 84 | 55.6 | 90 | 50.0 |
| 5 | 96 | 45.5 | 102 | 41.7 | 108 | 38.5 | 114 | 35.7 | 120 | 33.3 |
| 6 | 126 | 31.3 | 132 | 29.4 | 138 | 27.8 | 144 | 26.3 | 150 | 25.0 |
| 7 | 150 | 19.0 | 150 | 13.6 | 150 | 8.7 | 150 | 4.2 | 150 | 0.0 |
| 8 | 156 | 4.0 | 162 | 8.0 | 168 | 12.0 | 174 | 16.0 | 180 | 20.0 |
| 9 | 186 | 19.2 | 192 | 18.5 | 198 | 17.9 | 204 | 17.2 | 210 | 16.7 |
| 10 | 216 | 16.1 | 222 | 15.6 | 228 | 15.2 | 234 | 14.7 | 240 | 14.3 |
| 11 | 246 | 13.9 | 252 | 13.5 | 258 | 13.2 | 264 | 12.8 | 270 | 12.5 |
| 12 | 276 | 12.2 | 282 | 11.9 | 288 | 11.6 | 294 | 11.4 | 300 | 11.1 |
| 13 | 300 | 8.7 | 300 | 6.4 | 300 | 4.2 | 300 | 2.0 | 300 | 0.0 |
| 14 | 300 | 0.0 | 300 | 0.0 | 300 | 0.0 | 300 | 0.0 | 300 | 0.0 |
| 15 | 300 | 0.0 | 300 | 0.0 | 300 | 0.0 | 300 | 0.0 | 300 | 0.0 |

(b)

| | TARGET FLOW RATE | | RATIO | INTERMEDIATE FLOW RATE |
|---|---|---|---|---|
| MEASUREMENT 1 | TIME 7 | 150 | 4.0 | 153.0 |
| | TIME 8 | 156 | | |
| MEASUREMENT 2 | TIME 7 | 150 | 8.0 | 156.0 |
| | TIME 8 | 162 | | |
| MEASUREMENT 3 | TIME 6 | 138 | 8.7 | 144.0 |
| | TIME 7 | 150 | | |
| MEASUREMENT 4 | TIME 6 | 144 | 4.2 | 147.0 |
| | TIME 7 | 150 | | |
| MEASUREMENT 5 | TIME 6 | 150 | 0.0 | 150.0 |
| | TIME 7 | 150 | | |
| AVERAGE FLOW RATE OF INTERMEDIATE FLOW RATES | | | | 150.0 |

FIG. 15
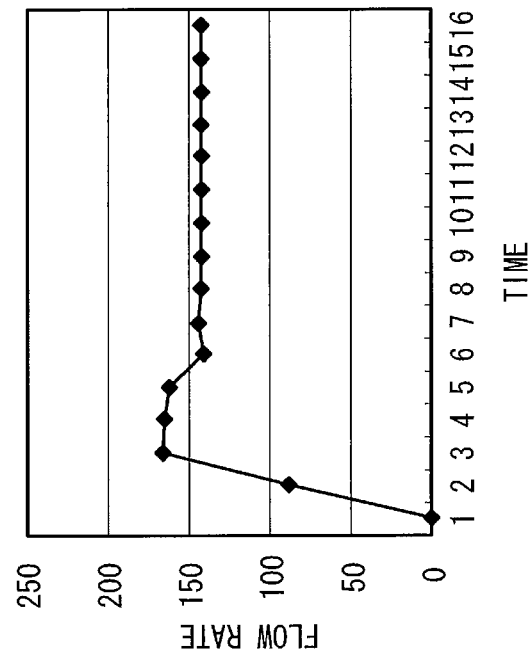
(b)
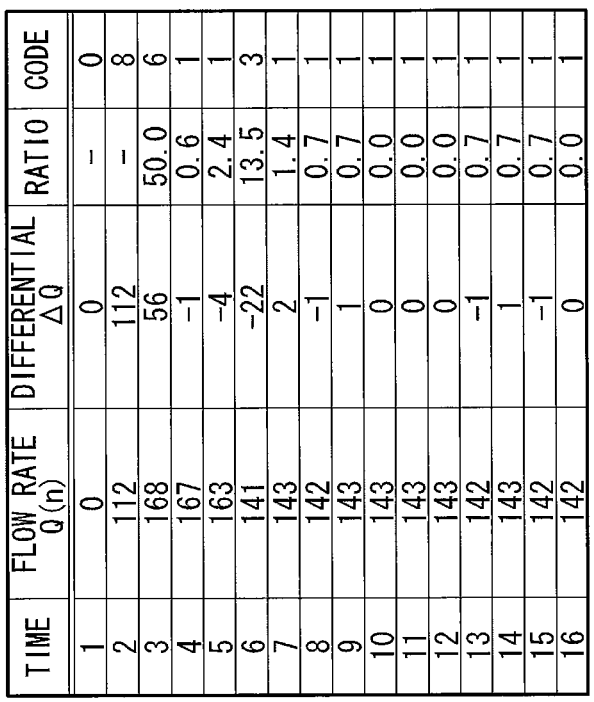
(a)
| TIME | FLOW RATE Q(n) | DIFFERENTIAL ΔQ | RATIO | CODE |
|---|---|---|---|---|
| 1 | 0 | 0 | — | 0 |
| 2 | 112 | 112 | — | 8 |
| 3 | 168 | 56 | 50.0 | 6 |
| 4 | 167 | -1 | 0.6 | 1 |
| 5 | 163 | -4 | 2.4 | 1 |
| 6 | 141 | -22 | 13.5 | 3 |
| 7 | 143 | 2 | 1.4 | 1 |
| 8 | 142 | -1 | 0.7 | 1 |
| 9 | 143 | 1 | 0.7 | 1 |
| 10 | 143 | 0 | 0.0 | 1 |
| 11 | 143 | 0 | 0.0 | 1 |
| 12 | 143 | 0 | 0.0 | 1 |
| 13 | 142 | -1 | 0.7 | 1 |
| 14 | 143 | 1 | 0.7 | 1 |
| 15 | 142 | -1 | 0.7 | 1 |
| 16 | 142 | 0 | 0.0 | 1 |
(c)
| APPLIANCE CHARACTERISTIC CODE SEQUENCE | 08131 |
|---|---|
| INTERMEDIATE FLOW RATE | 167.50 |
| INTERMEDIATE STABLE FLOW RATE | 165.00 |
| STABLE FLOW RATE | 142.75 |

| | (I) | | | | | | (II) | | | | |
|---|---|---|---|---|---|---|---|---|---|---|---|
| TIME | FLOW RATE Q(n) | DIFFER-ENTIAL ΔQ | RATIO | CODE | OFFSET FLOW RATE | TIME | FLOW RATE Q(n) | DIFFER-ENTIAL ΔQ | RATIO | CODE | OFFSET FLOW RATE |
| 1 | 0 | 0 | - | 0 | 0.0 | 16 | 316 | 112 | 56000 | 8 | 203.8 |
| 2 | 90 | 90 | - | 7 | 0.0 | 17 | 372 | 56 | 49.9 | 6 | 203.8 |
| 3 | 145 | 55 | 61.1 | 6 | 0.0 | 18 | 371 | -1 | 0.6 | 1 | 203.8 |
| 4 | 150 | 5 | 3.4 | 1 | 0.0 | 19 | 367 | -4 | 2.4 | 1 | 203.8 |
| 5 | 158 | 8 | 5.3 | 1 | 0.0 | 20 | 345 | -22 | 13.5 | 3 | 203.8 |
| 6 | 208 | 50 | 31.6 | 5 | 0.0 | 21 | 347 | 2 | 1.4 | 1 | 203.8 |
| 7 | 203 | -5 | 2.4 | 1 | 0.0 | 22 | 346 | -1 | 0.7 | 1 | 203.8 |
| 8 | 204 | 1 | 0.5 | 1 | 0.0 | 23 | 347 | 1 | 0.7 | 1 | 203.8 |
| 9 | 204 | 0 | 0.0 | 1 | 0.0 | 24 | 347 | 0 | 0.0 | 1 | 203.8 |
| 10 | 204 | 0 | 0.0 | 1 | 0.0 | 25 | 347 | 0 | 99.9 | 1 | 346.8 |
| 11 | 204 | 0 | 99.9 | 1 | 203.8 | 26 | 347 | 0 | 0.0 | 1 | 346.8 |
| 12 | 204 | 0 | 0.0 | 1 | 203.8 | 27 | 346 | -1 | 500.0 | 1 | 346.8 |
| 13 | 204 | 0 | 0.0 | 1 | 203.8 | 28 | 347 | 1 | 125.0 | 1 | 346.8 |
| 14 | 203 | -1 | 500.0 | 1 | 203.8 | 29 | 346 | -1 | 500.0 | 1 | 346.8 |
| 15 | 204 | 1 | 125.0 | 1 | 203.8 | 30 | 346 | 0 | 0.0 | 1 | 346.8 |

(b)

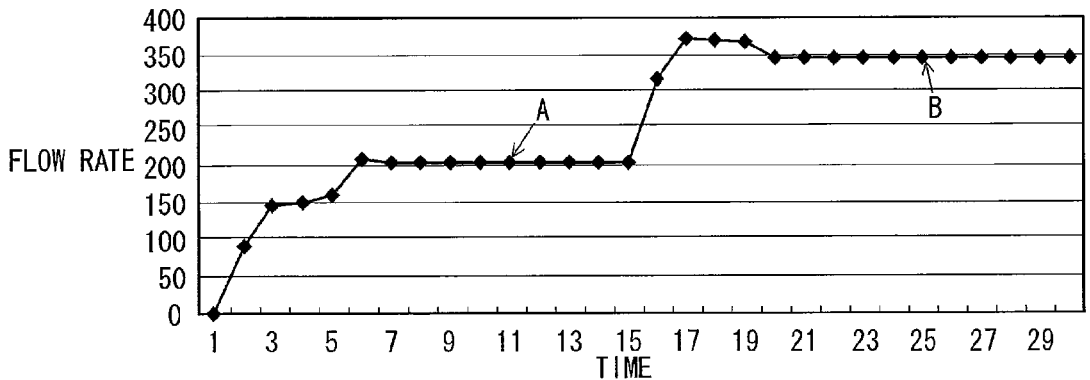

(c)

| | | | |
|---|---|---|---|
| (I) | APPLIANCE CHARACTERISTIC CODE SEQUENCE | | 07151 |
| | INTERMEDIATE FLOW RATE | | 147.50 |
| | INTERMEDIATE STABLE FLOW RATE | | 154.00 |
| | STABLE FLOW RATE | | 203.75 |
| (II) | APPLIANCE CHARACTERISTIC CODE SEQUENCE | | 08131 |
| | INTERMEDIATE FLOW RATE | | 167.70 |
| | INTERMEDIATE STABLE FLOW RATE | | 165.20 |
| | STABLE FLOW RATE | | 142.95 |

(a)

| TIME | FLOW RATE Q(n) | DIFFERENTIAL ΔQ | CODE | OFFSET FLOW RATE |
|---|---|---|---|---|
| 1 | 0 | 0 | 0 | 0.0 |
| 2 | 90 | 90 | 7 | 0.0 |
| 3 | 145 | 55 | 6 | 0.0 |
| 4 | 150 | 5 | 1 | 0.0 |
| 5 | 158 | 8 | 1 | 0.0 |
| 6 | 208 | 50 | 5 | 0.0 |
| 7 | 203 | -5 | 1 | 0.0 |
| 8 | 204 | 1 | 1 | 0.0 |
| 9 | 204 | 0 | 1 | 0.0 |
| 10 | 204 | 0 | 1 | 0.0 |
| 11 | 204 | 0 | 1 | 203.8 |
| 12 | 204 | 0 | 1 | 203.8 |
| 13 | 203 | -1 | 1 | 203.8 |
| 14 | 190 | -13 | 2 | 203.8 |
| 15 | 189 | -1 | 1 | 203.8 |
| 16 | 190 | 1 | 1 | 203.8 |
| 17 | 189 | -1 | 1 | 203.8 |
| 18 | 190 | 1 | 1 | 203.8 |
| 19 | 190 | 0 | 1 | 189.6 |
| 20 | 190 | 0 | 1 | 189.6 |
| 21 | 190 | 0 | 1 | 189.6 |
| 22 | 180 | -10 | 2 | 189.6 |
| 23 | 180 | 0 | 1 | 189.6 |
| 24 | 179 | -1 | 1 | 189.6 |
| 25 | 179 | 0 | 1 | 189.6 |
| 26 | 180 | 1 | 1 | 189.6 |
| 27 | 180 | 0 | 1 | 179.6 |
| 28 | 180 | 0 | 1 | 179.6 |
| 29 | 180 | 0 | 1 | 179.6 |
| 30 | 179 | -1 | 1 | 179.6 |
| 31 | 180 | 1 | 1 | 179.6 |
| 32 | 179 | -1 | 1 | 179.6 |

(b)

(a)

| TIME | FLOW RATE Q(n) | DIFFERENTIAL ΔQ | CODE | OFFSET FLOW RATE |
|---|---|---|---|---|
| 1 | 0 | 0 | 0 | 0.0 |
| 2 | 90 | 90 | 7 | 0.0 |
| 3 | 145 | 55 | 6 | 0.0 |
| 4 | 150 | 5 | 1 | 0.0 |
| 5 | 158 | 8 | 1 | 0.0 |
| 6 | 208 | 50 | 5 | 0.0 |
| 7 | 203 | -5 | 1 | 0.0 |
| 8 | 204 | 1 | 1 | 0.0 |
| 9 | 204 | 0 | 1 | 0.0 |
| 10 | 204 | 0 | 1 | 0.0 |
| 11 | 204 | 0 | 1 | 203.8 |
| 12 | 204 | 0 | 1 | 204.0 |
| 13 | 200 | -4 | 1 | 203.2 |
| 14 | 198 | -2 | 1 | 202.0 |
| 15 | 198 | 0 | 1 | 200.8 |
| 16 | 198 | 0 | 1 | 199.6 |
| 17 | 198 | 0 | 1 | 198.4 |
| 18 | 194 | -4 | 1 | 197.2 |
| 19 | 192 | -2 | 1 | 196.0 |
| 20 | 192 | 0 | 1 | 194.8 |
| 21 | 192 | 0 | 1 | 193.6 |
| 22 | 192 | 0 | 1 | 192.4 |
| 23 | 188 | -4 | 1 | 191.2 |
| 24 | 186 | -2 | 1 | 190.0 |
| 25 | 186 | 0 | 1 | 188.8 |
| 26 | 186 | 0 | 1 | 187.6 |
| 27 | 186 | 0 | 1 | 186.4 |
| 28 | 186 | 0 | 1 | 186.0 |
| 29 | 186 | 0 | 1 | 186.0 |
| 30 | 186 | 0 | 1 | 186.0 |
| 31 | 186 | 0 | 1 | 186.0 |
| 32 | 186 | 0 | 1 | 186.0 |

(b)

FLOW RATE MEASUREMENT DEVICE

This application is a 371 application of PCT/JP2010/006462 having an international filing date of Nov. 2, 2010, which claims priority to JP2009-251699 filed Nov. 2, 2009, the entire contents of which are incorporated herein by reference.

TECHNICAL FIELD

The present invention relates to a technique for correctly identifying an appliance which uses a fluid by capturing a change in a flow rate of the fluid.

BACKGROUND ART

As a gas meter of the related art which specifies a used appliance in a fluid piping system having a gas meter, a gas meter described in Patent Literature 1 is known. The configuration will be described with reference to FIG. 19.

As shown in FIG. 19, a gas meter 1 is disposed in a flow channel 6 connected to a household gas supply line. The gas meter 1 has flow rate measurement unit 3 for measuring a gas flow rate at a regular time interval, calculation unit 4 for calculating a differential in the flow rates output from the flow rate measurement unit 3, and comparison/determination unit 7 for comparing in magnitude the differential calculated by the calculation unit 4 with a change determination value registered in storage unit 5 and determining a change in the state of usage of the gas appliance. The calculation unit 4, the comparison/determination unit 7, and a gas shutoff valve 2 are controlled by a control circuit 116.

In the gas meter 1, the change in the differential of the instantaneous flow rate output from the flow rate measurement unit 3 is sequentially calculated, and the change in the state of usage of the gas appliance is determined on the basis of the amount of change. Registered data and the measured change (differential) in the gas flow rate are compared, thereby enabling identification of used gas appliances 13, 14, and 15.

As a method of identifying the used appliance of the fluid in the related art, a method described in Patent Literature 2 is known. The configuration will be described with reference to FIG. 20.

As shown in FIG. 20, a calculation unit 108 calculates the differentials of the gas flow rate measured by flow rate measurement unit 104 at regular intervals, and a differential conversion unit 112 classifies the differentials at regular time intervals into predetermined classifications using a flow rate classification table 110a stored in flow rate classification table holding unit 110, and converts the differentials to predetermined codes representing the classifications. An appliance identification unit 116 compares a code sequence generated by code sequence generation unit 114 using the codes converted by the differential conversion unit 112 with appliance-specific characteristic code sequences specific to the appliances stored in an appliance-specific code sequence information holding unit 118, and identifies the appliances.

In the above configuration, a code value obtained by encoding (converting) the differential of the flow rate is used, and at the time of appliance identification, calculation is simplified, thereby reducing the amount of memory or the like necessary for calculation and achieving improvement in calculation speed and appliance identification precision.

CITATION LIST

Patent Literature

Patent Literature 1: JP-A-2006-313114
Patent Literature 2: JP-A-2008-309498

SUMMARY OF INVENTION

Technical Problem

However, with the configuration of the related art, for example, in a hot plate or the like which causes ignition by a pilot burner, when a user confirms a flame and releases his/her hand from a knob, the flow rate decreases. Meanwhile, the time until the hand is released varies, the gentle ignition time of a fan heater or the like varies, or when the gentle ignition time is short, it is difficult to clearly recognize the characteristics depending on the measurement timing. For this reason, in the flow rate differential or the code sequence, erroneous determination may be made at the time of comparison with data registered in advance when the appliances are used alone or in combination.

The invention solves the problems of the related art, and an object of the invention is to simplify calculation, to reduce the amount of memory necessary for calculation, to absorb variations resulting from manual operation or ignition state when the appliances are used alone or in combination, and to improve appliance identification precision with a configuration which extracts characteristics of appliances.

Solution to Problem

In order to solve the problems of the related art, a flow rate measurement device according to an aspect of the invention includes a flow rate measurement unit that is configured to measure a flow rate of a fluid flowing in a flow channel at a regular time interval; a calculation unit that is configured to calculate differentials at regular time intervals in the flow rate measured by the flow rate measurement unit; a flow rate classification table in which a plurality of differential classifications classified according to the magnitude of the differentials are associated with codes representing the respective classifications; a differential conversion unit that is configured to convert the differentials calculated by the calculation unit to the codes on the basis of the flow rate classification table; an appliance characteristic extraction unit that is configured to generate an appliance-specific code sequence representing characteristics of an appliance from the codes obtained at regular time intervals by the differential conversion unit or extract a plurality of appliance characteristic flow rates representing characteristics of appliances from the flow rate measured by the flow rate measurement unit; and an appliance identification unit that is configured to compare at least either the appliance characteristic code sequence extracted by the appliance characteristic extraction unit with an appliance-specific characteristic code sequences specific to appliances held in an appliance-specific characteristic information holding unit or a plurality of appliance characteristic flow rates extracted by the appliance characteristic extraction unit with a plurality of appliance-specific characteristic flow rates specific to appliances held in the appliance-specific characteristic information holding unit so as to identity the appliance, wherein the appliance determination unit monitors and determines the change in a flow rate measured by a flow rate measurement unit, monitors and determines the code obtained by differential conversion unit, and extracts appliance characteristic flow rates representing the characteristics of the appliance.

Therefore, it is possible to extract the flow rates representing the characteristics of the appliances as well as the degree of increase/decrease in the flow rate, that is, the characteristics of the appliances with an increase or decrease in the codes, to absorb variations resulting from manual operation or ignition state, and to extract the stable characteristics of the appliances when the appliances are used alone or in combination.

Advantageous Effects of Invention

According to the flow rate measurement device of the invention, it is possible to simplify calculation, to reduce the amount of memory necessary for calculation, to absorb variations resulting from manual operation or ignition state, and to improve appliance identification precision when the appliances are used along or in combination with a configuration which extracts the characteristics of the appliances.

BRIEF DESCRIPTION OF DRAWINGS

FIG. 2 is a diagram showing an example of a flow rate classification table in Embodiments 1 to 8 of the invention.

In FIG. 4, (a) is a diagram showing a concept of classifying flow rate differentials when using a gas appliance B in accordance with a flow rate classification table in Embodiment 1 of the invention, (b) is a graph showing flow rate characteristics when using the gas appliance B, (c) is a graph showing codes classified when using the gas appliance B.

In FIG. 5, (a) is a diagram showing a concept of classifying flow rate differentials when using a gas appliance C in accordance with a flow rate classification table in Embodiment 2 of the invention, (b) is a graph showing flow rate characteristics when using the gas appliance C, (c) is a diagram showing a concept of classifying flow rate differentials at the time of pilot burner OFF delay of the gas appliance C in accordance with a flow rate classification table, and (d) is a graph showing flow rate characteristics at the time of pilot burner OFF delay of the gas appliance C.

In FIG. 7, (a) is a diagram showing a flow rate change and a ratio list of a current flow rate and a previous flow rate in Measurement 1 to Measurement 5 when using a gas appliance D in Embodiment 3 of the invention, and (b) to (f) are graphs showing flow rate characteristics of Measurements 1 to 5 when using the gas appliance D.

FIG. 8 is a diagram showing an intermediate flow rate list when using a gas appliance D in Embodiment 3 of the invention.

In FIG. 9, (a) is a diagram showing a flow rate change and a ratio list of a current flow rate and a previous flow rate in Measurement 1 to Measurement 5 when using a gas appliance D in Embodiment 4 of the invention, and (b) is a diagram showing an intermediate flow rate list when using the gas appliance D.

In FIG. 11, (a) is a diagram showing a concept of characteristic extraction when using a gas appliance C in Embodiment 5 of the invention, (b) is a graph showing flow rate characteristics when using the gas appliance C, (c) is a graph showing codes classified when using the gas appliance C, and (d) is a diagram showing a characteristic list extracted when using the gas appliance C.

In FIG. 12, (a) is a diagram showing characteristic lists for comparison in Embodiment 5 of the invention, (b) is a diagram showing characteristic lists for comparison when there is no intermediate stable flow rate in a registered appliance and there is an intermediate stable flow rate in a used appliance, and (c) is a diagram showing characteristic lists for comparison when there is an intermediate stable flow rate in a registered appliance and there is no intermediate stable flow rate in a used appliance.

In FIG. 13, (a) is a diagram showing a flow rate change and a ratio list of a current flow rate and a previous flow rate in Measurement 1 to Measurement 5 when using a gas appliance D in Embodiment 6 of the invention, and (b) is a diagram showing an intermediate flow rate list when using the gas appliance D.

In FIG. 15, (a) is a diagram showing a concept of characteristic extraction when using a gas appliance C in Embodiment 7 of the invention, (b) is a graph showing flow rate characteristics when using the gas appliance C, and (c) is a diagram showing a characteristic list extracted when using the gas appliance C.

In FIG. 16, (a) is a diagram showing a concept of characteristic extraction when using a gas appliance A and a gas appliance C in combination in Embodiment 7 of the invention, (b) is a graph showing flow rate characteristics when using the gas appliance A and the gas appliance C in combination, and (c) is a diagram showing a characteristic list extracted when using the gas appliance A and the gas appliance C in combination.

DESCRIPTION OF EMBODIMENTS

Figure 1:
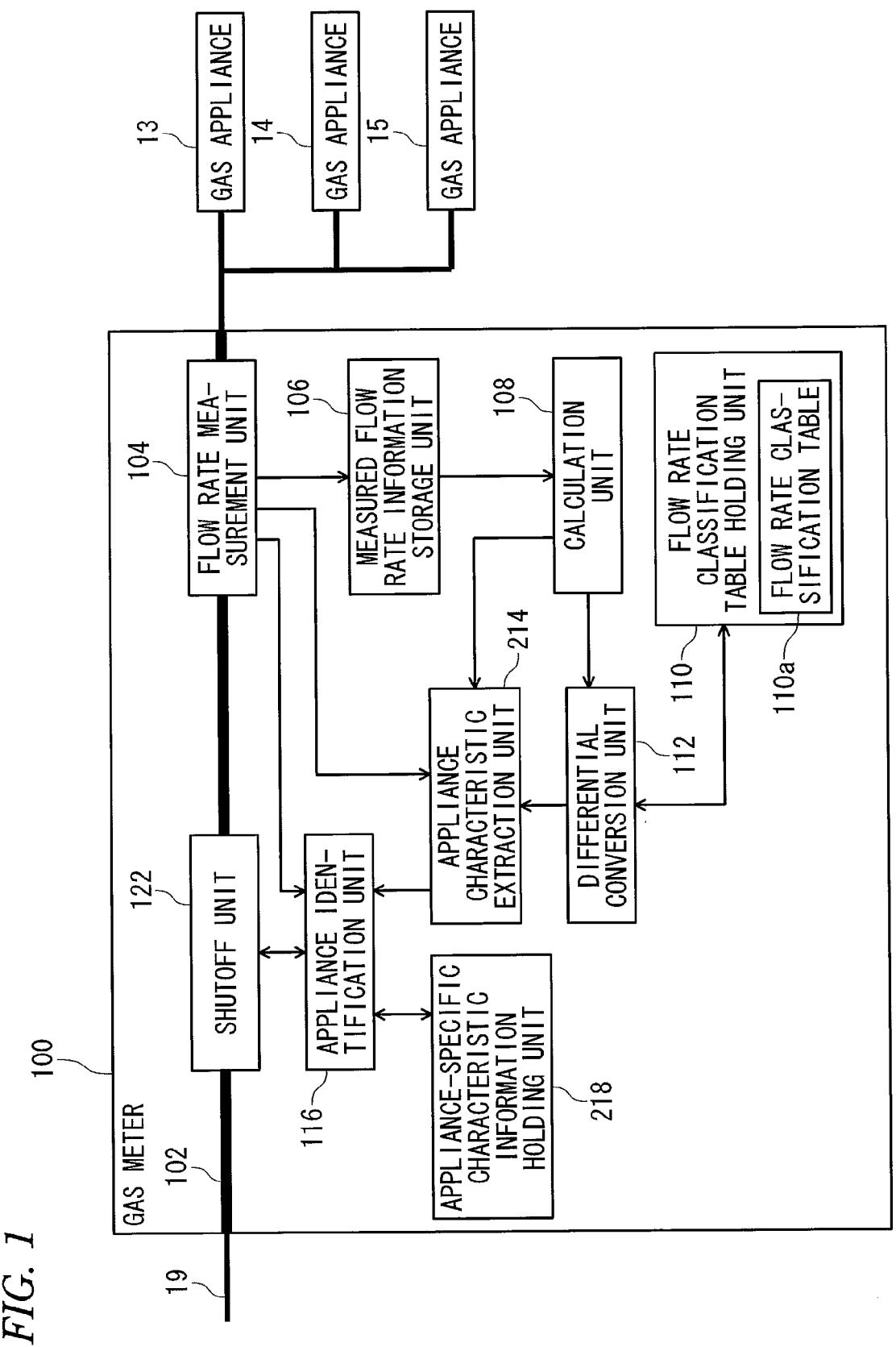
FIG. 1 is a block diagram of a flow rate measurement device in Embodiments 1 to 8 of the invention.

A first aspect of the invention is configured to include: a flow rate measurement unit that is configured to measure a flow rate of a fluid flowing in a flow channel at a regular time interval; a calculation unit that is configured to calculate differentials at regular time intervals in the flow rate measured by the flow rate measurement unit; a flow rate classification table in which a plurality of differential classifications classified according to the magnitude of the differentials are associated with codes representing the respective classifications; a differential conversion unit that is configured to convert the differentials calculated by the calculation unit to the codes on the basis of the flow rate classification table; an appliance characteristic extraction unit that is configured to generate an appliance-specific code sequence representing a characteristic of an appliance from the codes obtained at regular time intervals by the differential conversion unit or extract a plurality of appliance characteristic flow rates representing characteristics of appliances from the flow rate measured by the flow rate measurement unit; and an appliance identification unit that is configured to compare at least either the appliance characteristic code sequence extracted by the appliance characteristic extraction unit with appliance-specific characteristic code sequences specific to appliances held in an appliance-specific characteristic information holding unit or a plurality of appliance characteristic flow rates extracted by the appliance characteristic extraction unit with a plurality of appliance-specific characteristic flow rates specific to appliances held in the appliance-specific characteristic information holding unit so as to identity the appliance, wherein when codes within a predetermined range from among the codes obtained by the differential conversion unit appear continuously a first predetermined number of times, the appliance characteristic extraction unit stores an average value of the flow rates until appeared continuously the first predetermined number of times as an intermediate stable flow rate of the appliance characteristic flow rates, and when codes within a predetermined range from among the codes obtained by the differential conversion unit appear continuously a second predetermined number of times, the appliance characteristic extraction unit stores an average value of the flow rates until appeared continuously the second predetermined number of times as a stable flow rate of the appliance characteristic flow rates.

Therefore, it becomes possible to extract flow rates representing characteristics when the appliances are in operation and flow rates representing characteristics in a stable state, and to extract the stable characteristics of the appliances.

A second aspect of the invention is configured so that in the first aspect of the invention, when the codes within the predetermined range from among the codes obtained by the differential conversion unit appear continuously the first predetermined number of times, the appliance characteristic extraction unit stores the average value of the flow rates until appeared continuously the first predetermined number of times as an intermediate stable flow rate, then, when the codes within the predetermined range appearing continuously reaches the second predetermined number of times, the appliance characteristic extraction unit stores the average value of the flow rates until appeared continuously the second predetermined number of times as a stable flow rate and delete the stored intermediate stable flow rate, and then, when the codes within the predetermined range appear continuously the second predetermined number of times again after the codes obtained by the differential conversion unit are outside the predetermined range, the appliance characteristic extraction unit stores the stored stable flow rate again as a new intermediate stable flow rate and store an average value of the flow rates until appeared continuously the second predetermined number of times as a new stable flow rate.

Therefore, even when there are variations resulting from manual operation or ignition state, it becomes possible to extract flow rates representing characteristics when the appliances are in operation and flow rates representing characteristics in a stable state, and to extract the stable characteristics of the appliances.

A third aspect of the invention is configured so that in the first aspect of the invention, the appliance characteristic extraction unit is configured to monitor the flow rate measured by the flow rate measurement unit, and when the flow rate is equal to or higher than a first predetermined flow rate and equal to or lower than a second predetermined flow rate, the appliance characteristic extraction unit calculates a ratio of a previous flow rate and a current flow rate, and if the ratio is within a predetermined ratio range, the appliance characteristic extraction unit stores an average flow rate of the current flow rate and the previous flow rate at that time as an intermediate flow rate and stops to monitor an intermediate flow rate subsequently.

Therefore, it becomes possible to extract the flow rates representing the characteristics which are hard to be clearly recognized depending on the measurement timings when the appliances are in operation, and to extract the stable characteristics of the appliances.

A fourth aspect of the invention is configured so that in the first aspect of the invention, the appliance characteristic extraction unit is configured to monitor the flow rate measured by the flow rate measurement unit, and when the flow rate is equal to or higher than a first predetermined flow rate and equal to or lower than a second predetermined flow rate, the appliance characteristic extraction unit calculates a ratio of a previous flow rate and a current flow rate, and if the ratio is within a predetermined ratio range, the appliance characteristic extraction unit stores an average flow rate of the current flow rate and the previous flow rate at that time as an intermediate flow rate, and then, when a calculated ratio is closer to 1 than a previously calculated ratio is, the appliance characteristic extraction unit stores an average flow rate of the current flow rate and the previous flow rate at that time again as an intermediate flow rate, whereas when the calculated ratio is not closer to 1 than the previously calculated ratio is, and if the ratio is outside the predetermined ratio range or the flow rate exceeds the second predetermined flow rate, the appliance characteristic extraction unit stops to monitor an intermediate flow rate subsequently.

Therefore, it becomes possible to extract the flow rates representing the characteristics which are hard to be clearly recognized depending on the measurement timings when the appliances are in operation, and to extract the stable characteristics of the appliances.

A fifth aspect of the invention is configured so that in the first aspect of the invention, the appliance determination unit is configured to compare and determine stable flow rates, intermediate stable flow rates, and intermediate flow rates between a plurality of appliance characteristic flow rates extracted by the appliance characteristic extraction unit and a plurality of appliance-specific characteristic flow rates held in the appliance-specific characteristic information holding unit, when there is an intermediate stable flow rate among the appliance characteristic flow rates extracted by and held in the appliance characteristic extraction unit, and there is no intermediate stable flow rate and there is an intermediate flow rate among the appliance-specific characteristic flow rates held in the appliance-specific characteristic information holding unit, the appliance determination unit compares and determines the intermediate stable flow rate extracted by the appliance characteristic extraction unit and the intermediate flow rate held in the appliance-specific characteristic information holding unit, and when there is no intermediate stable flow rate and there is an intermediate flow rate among the appliance characteristic flow rates extracted by and held in the appliance characteristic extraction unit, and there is an intermediate stable flow rate among the appliance-specific characteristic flow rates held in the appliance-specific characteristic information holding unit, the appliance determination unit compares and determines the intermediate flow rate extracted by the appliance characteristic extraction unit and the intermediate stable flow rate held in the appliance-specific characteristic information holding unit.

Therefore, it becomes possible to absorb variations resulting from the measurement timing, manual operation, or the like, and to improve appliance identification precision of the appliances.

A sixth aspect of the invention is configured so that in the first aspect of the invention, when the appliance determination unit has determined to be the same appliance by comparing either the appliance characteristic code sequence extracted by the appliance characteristic extraction unit with the appliance-specific characteristic code sequence representing the characteristic code sequences specific to the appliance held in the appliance-specific characteristic information holding unit or a plurality of appliance characteristic flow rates extracted by the appliance characteristic extraction unit with a plurality of appliance-specific characteristic flow rates specific to the appliances held in the appliance-specific characteristic information holding unit, the appliance determination unit adds and holds the intermediate flow rate extracted by the appliance characteristic extraction unit when the appliance characteristic extraction unit has determined to be the same as an appliance in which there is an intermediate flow rate among a plurality of appliance-specific characteristic flow rates specific to the appliances held in the appliance-specific characteristic information holding unit, and when the corresponding appliance appears a predetermined number of times, the appliance characteristic extraction unit calculates an average value of the added and held intermediate flow rates and stores the calculated average value in the intermediate flow rate of the appliance-specific characteristic flow rates held in the appliance-specific characteristic information holding unit.

Therefore, it is possible to absorb variations in the appliance characteristic flow rate resulting from the measurement timing, to achieve high precision, and to improve appliance identification precision of the appliances.

A seventh aspect of the invention is configured so that in the first aspect of the invention, when codes within a second predetermined range from among the codes obtained by the differential conversion unit appears continuously a third predetermined number of times, the appliance characteristic extraction unit stores an average value of the flow rates until appeared continuously the third predetermined number of times as an offset flow rate, when one of an intermediate stable flow rate, a stable flow rate, and an intermediate flow rate of the extracted appliance characteristic flow rates is extracted, the appliance characteristic extraction unit stores a differential flow rate obtained by subtracting the offset flow rate from the extracted appliance characteristic flow rate, and after the codes obtained by the differential conversion unit are outside the second predetermined range, when the codes obtained by the differential conversion unit appear continuously the third predetermined number of times within the second predetermined range, the appliance characteristic extraction unit calculates and stores an offset flow rate.

Therefore, it becomes possible to extract the characteristics of the appliances when the appliances are used in combination in the same manner as when the appliances are used alone, and to improve appliance identification precision of the appliances.

An eighth aspect of the invention is configured so that in the first aspect of the invention, when the codes obtained by the differential conversion unit appear continuously within the second predetermined range even after the offset flow rate is stored, the appliance characteristic extraction unit stores an average value of the flow rates before the third predetermined number of times again as an offset flow rate.

Therefore, it is possible to achieve high precision of the appliance characteristic flow rates to be extracted, and to improve appliance identification precision of the appliances.

A ninth aspect of the invention is a program which causes a computer to function as a whole or a part of the flow rate measurement device as set forth in any one of the first to eight aspects of the invention. With this program, at least a portion of the program of the invention can be easily realized using a general-use computer or a server. The program may be recorded on a recording medium or may be distributed using a communication line, thereby simplifying program distribution or installation.

Hereinafter, embodiments of the invention will be described with reference to the drawings. It should be noted that the embodiments are not intended to limit the invention. In the description of the embodiments, the parts having the same configuration and functional effects are represented by the same reference numerals, and overlapping description will not be repeated.

Embodiment 1

FIG. 1 is a block diagram of a flow rate measurement device in Embodiment 1 of the invention.

In FIG. 1, a gas meter 100 includes a flow channel 102, a flow rate measurement unit 104, a measured flow rate information storage unit 106, a calculation unit 108, a flow rate classification table holding unit 110, a differential conversion unit 112, an appliance characteristic extraction unit 214, an appliance identification unit 116, and an appliance-specific characteristic information holding unit 218. The gas meter 100 is disposed in the flow channel 102, and includes a shutoff unit 122 which shuts off gas in emergency or the like.

An ultrasonic flowmeter serving as the flow rate measurement unit 104 emits ultrasonic waves with respect to gas as a fluid flowing in the flow channel 102 at regular time intervals to measure the gas flow rate, and a general ultrasonic flowmeter may be used. The measured flow rate information storage unit 106 stores target data in which a measured flow rate measured by the flow rate measurement unit 104 is described in association with the measurement time at which the measured flow rate is measured.

The calculation unit 108 calculates differentials in the gas flow rate measured by the flow rate measurement unit 104 at regular time intervals corresponding to the above-described ultrasonic wave emission interval. For example, in FIG. 3(a) described below, when a flow rate (absolute flow rate) at a predetermined timing is 90 L/h (liters per hour), and a flow rate at the next timing is 145 L/h, the differential at this time is calculated to be 145·90=55 (L/h). The flow rate classification table holding unit 110 holds a flow rate classification table 110a shown in FIG. 2 in which a plurality of differential classifications classified according to the magnitude of the differentials are associated with codes representing the respective classifications. The flow rate classification table 110a serves as a conversion table which classifies the absolute values of the measured differentials into predetermined classifications and converts the differentials to predetermined codes representing the classifications. The number of classifications of the flow rate classification table 110a is not particularly limited, and in FIG. 2, for example, the differentials are classified into 16 codes. Although a region where it is determined that the flow rate is zero is described, there are few cases where the flow rate measured in the actual device is completely zero because of a few variations. Accordingly, the condition that the flow rate is zero includes when the flow rate is approximately zero, substantially zero.

The ranges of the classifications are fragmented with different flow rate intervals. For example, the ranges of the classifications are fragmented with an increasing differential in the flow rate such that the codes 1 to 5 are 10 L/h, the codes 6 to B are 25 L/h, the codes C to D are 50 L/h, and the code E is 100 L/h. With this configuration, since there are many kinds of appliances in a region where the differential is small, the interval decreases, thereby increasing identification precision. The codes A to F express 10 to 15 in hexadecimal, and magnitude comparison can be performed with the codes as numerical values.

The differential conversion unit 112 converts the differentials calculated by the calculation unit 108 to the codes representing the respective classifications, into which the differentials at regular time interval (of ultrasonic wave emission) are classified, on the basis of the flow rate classification table 110a.

The appliance characteristic extraction unit 214 generates an extracted code sequence representing the characteristics of the appliances from a measured code sequence obtained by actual measurement on the basis of a set of codes at regular time intervals obtained by the differential conversion unit 112. The measured code sequence expresses the change in the flow rate of the fluid in a pseudo manner. The appliance characteristic extraction unit 214 records the extracted code sequence representing the characteristics of the appliances in a memory (not shown) as necessary. The appliance characteristic extraction unit 214 monitors the gas flow rate measured by the flow rate measurement unit 104, extracts a plurality of appliance characteristic flow rates including, for example, the gentle ignition flow rate of the fan heater representing the characteristics of the appliances from the change in the flow rate, and stores the plurality of appliance characteristic flow rates in the memory (not shown) as necessary.

The appliance identification unit 116 identifies a gas appliance using gas as a fluid on the basis of the extracted code sequence extracted by the appliance characteristic extraction unit 214 and the appliance characteristic flow rate. The appliance identification unit 116 compares the extracted code sequence with appliance-specific characteristic code sequences representing characteristic code sequences specific to the appliances stored in the appliance-specific characteristic information holding unit 218 in advance for the gas appliances or a plurality of appliance characteristic flow rates, and identifies a gas appliance using gas from a similarity relation or the like.

The gas meter 100 is connected to a gas duct 19 on the upstream side, and is also connected to various gas appliances 13, 14, and 15, such as a hot plate, a fan heater, and floor heating, on the downstream side.

With regards to the flow rate measurement device configured as above, the operation of an appliance characteristic extraction process will be hereinafter described.

First, a flow rate (absolute flow rate) $Q(n)$ measured by the flow rate measurement unit 104 at a regular time interval (for example, 0.5 seconds or the like) and a previously measured flow rate $Q(n-1)$ are temporarily stored in the measured flow rate information storage unit 106. Thereafter, a differential $\Delta Q(n)=Q(n)-Q(n-1)$ which is the difference between $Q(n)$ and the previously measured flow rate $Q(n-1)$ is calculated by the calculation unit 108. The regular time interval may be 1 second or 2 seconds.

Figure 3:
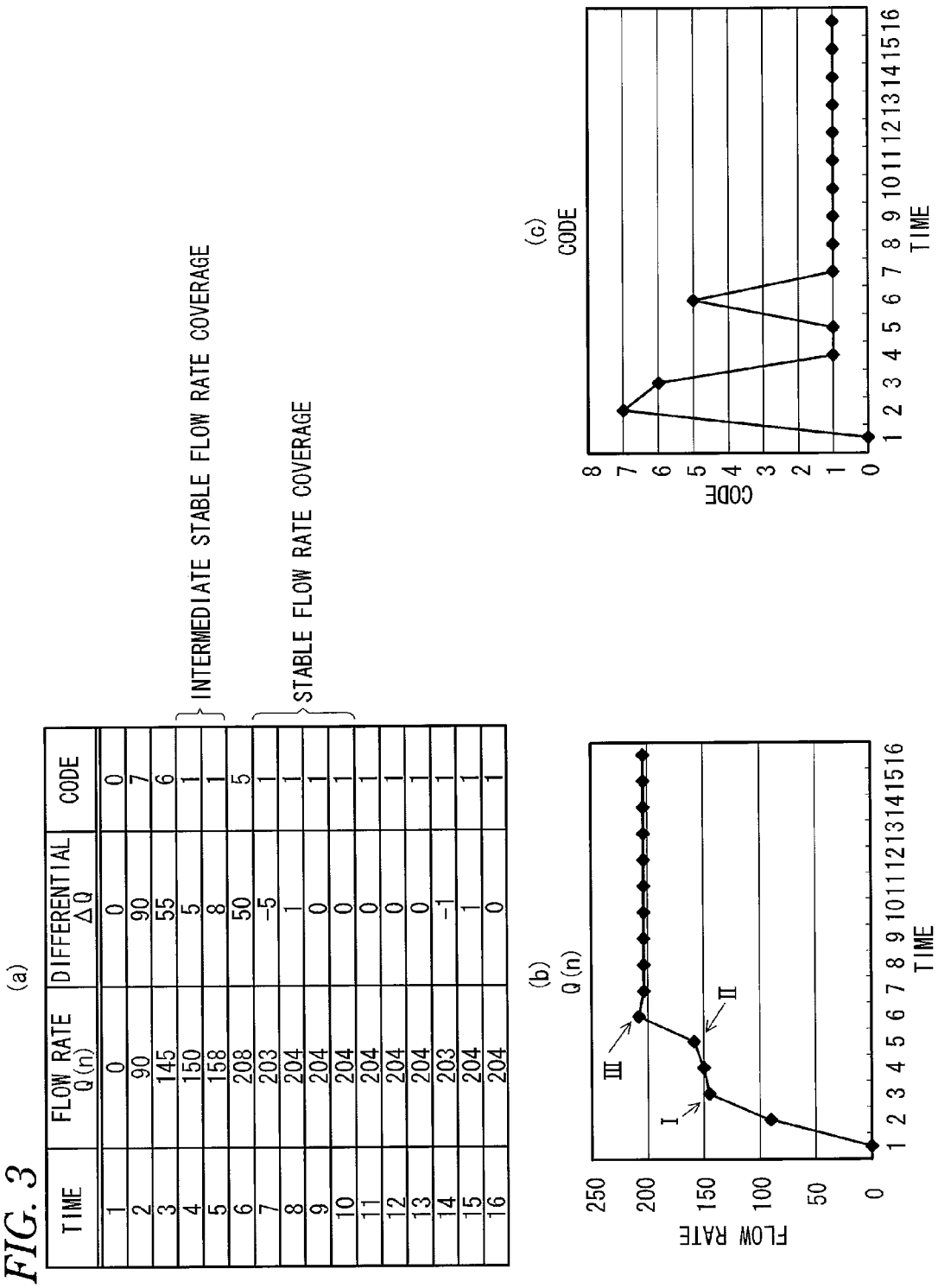
In FIG. 3, (a) is a diagram showing a concept of classifying flow rate differentials when using a gas appliance A in accordance with a flow rate classification table in Embodiment 1 of the invention, (b) is a graph showing flow rate characteristics when using the gas appliance A, and (c) is a graph showing codes classified when using the gas appliance A.

The differential conversion unit 112 converts the absolute value of the differential $\Delta Q(n)$ calculated by the calculation unit 108 to a classification code, which is a code representing each of the classifications for classifying the differentials at regular time intervals, with reference to the flow rate classification table 110a of FIG. 2. FIGS. 3(a) to 3(c) show an example of conversion using the flow rate classification table. If a gas appliance A (for example, a fan heater) corresponding to one of the gas appliances 13, 14, and 15 of FIG. 1 starts to be activated and a gas flow rate is generated, as shown in "FLOW RATE" of FIG. 3(a) and a graph of FIG. 3(b), the flow rate to be measured changes from the flow rate $Q(n)=0$ to the flow rate $Q(n)\neq 0$, and the flow rate changes depending on the used amount of gas. Simultaneously with measurement of the flow rate by the flow rate measurement unit 104, the calculation unit 108 calculates a differential, and the differential conversion unit 112 converts the differential to a classification code (shown in a "CODE" sequence of FIG. 3(a)).

When codes converted by the differential conversion unit 112 are within a predetermined range, for example, codes equal to or smaller than 2 appear continuously a first predetermined number of times, for example, two times, the appliance characteristic extraction unit 214 calculates the average value of the flow rates at that time and stores the average value as an intermediate stable flow rate. As shown in FIG. 3(a), at the time 4 and the time 5, codes equal to or smaller than 2 appear continuously two times. In this case, the average value 154 L/h of the flow rate 150 L/h of the time 4 and the flow rate 158 L/h of the time 5 is stored as the intermediate stable flow rate.

When codes converted by the differential conversion unit 112 are within a predetermined range, for example, codes equal to or smaller than 2 appear continuously a second predetermined number of times, for example, four times, the appliance characteristic extraction unit 214 calculates the average value of the flow rates at that time, and stores the average value as a stable flow rate. As shown in FIG. 3(a), at the time 7 to the time 10, codes are equal to or smaller than 2 appear continuously four times. In this case, the average value 203.75 L/h of the flow rate 203 L/h of the time 7, the flow rate 204 L/h of the time 8, the flow rate 204 L/h of the time 9, and the flow rate 204 L/h of the time 10 is stored as the stable flow rate.

As will be understood from the graph of FIG. 3(b), the stored intermediate stable flow rate corresponds to a gentle ignition flow rate (from a change point I to a change point II in the graph), the stable flow rate corresponds to a stable flow rate (after a change point III in the graph) immediately after ignition. It is thus understood that the appliance characteristic flow rates are sufficiently extracted.

As will be understood from the graph showing the change of the code shown in FIG. 3(c), when the appliance characteristic extraction unit 214 extracts the peak values of the peak and trough of the codes from the condition that the peak and trough of the codes represent the change points I, II, and III of FIG. 3(b), [07151] is extracted from a code sequence [0761115111111111] and stored as an appliance characteristic code sequence.

Similarly, FIGS. 4(a) to 4(c) are diagrams showing a concept of characteristic extraction when using a gas appliance B. As described above, the average value 99 L/h of the flow rate 95 L/h of the time 3 and the flow rate 103 L/h of the time 4 is as the intermediate stable flow rate, the average value 203.75 L/h of the flow rate 203 L/h of the time 7, the flow rate 204 L/h of the time 8, the flow rate 204 L/h of the time 9, and the flow rate 204 L/h of the time 10 is stored as the stable flow rate, and [07151] is extracted from the code sequence [0711551111111111].

With regards to the extracted intermediate stable flow rate, stable flow rate, and appliance characteristic code sequence, when comparing the gas appliance A with the gas appliance B, the stable flow rate and the appliance characteristic code sequence are the same, and the intermediate stable flow rate is different, making it possible to clearly identify the appliance A and the appliance B.

The intermediate stable flow rate, the stable flow rate, and the appliance characteristic code sequence specific to the appliances which are the individual rise characteristics of the gas appliances are stored in the appliance-specific characteristic information holding unit 218 in advance, and the intermediate stable flow rate, the stable flow rate, and the appliance characteristic code sequence of the used gas appliance are compared therewith and determined, thereby identifying whether the used gas appliance is one of a plurality of registered appliances or a new appliance.

Although as a method of calculating an intermediate stable flow rate and a stable flow rate, the average value of the flow rates when codes within a predetermined range appear continuously is described, the average value of codes within a predetermined range and a previous flow rate may be calculated.

Although as a method of calculating an intermediate stable flow rate and a stable flow rate, the average value is described, the first predetermined number of times and the second predetermined number of times may be increased, and the average value of the flow rates excluding the maximum value and the minimum value may be calculated taking into consideration variations in the flow rate.

As described above, in this embodiment, it becomes possible to extract flow rates representing characteristics when the appliances are in operation and flow rates representing characteristics in a stable state, to extract the stable characteristics of the appliances, and to identify the appliances with high precision.

Embodiment 2

FIGS. 5(*a*) to 5(*d*) are diagrams showing a concept of characteristic extraction in Embodiment 2 of the invention. As described in Embodiment 1, although it is possible to prevent erroneous identification by using the intermediate stable flow rate and the stable flow rate as well as the appliance characteristic code in determination, when codes within a predetermined range appear continuously the second predetermined number of times due to variations resulting from manual operation or the like even after an intermediate stable flow rate is stored, the intermediate stable flow rate may be recognized as a stable flow rate, and as a result, erroneous determination may be made.

For example, in a pilot burner-type gas appliance C (for example, a press rotation-type hot plate equipped with a pilot burner, or the like) having the rise characteristics of the flow rate shown in FIGS. 5(*a*) to 5(*d*), at the time of ignition, after the pilot burner is ignited, the burner is ignited. When the user confirms a flame of the burner and releases his/her hand from a knob, the pilot burner decreases in OFF flow rate, and the time until the hand is released varies.

The change in the flow rate when the hand is released from the knob immediately after ignition and the pilot burner is OFF is as shown in "FLOW RATE" of FIG. 5(*a*) and the graph of FIG. 5(*b*). Meanwhile, the change in the flow rate when the hand is released from the knob when some time has passed after ignition and the pilot burner is OFF is as shown in "FLOW RATE" of FIG. 5(*c*) and the graph of FIG. 5(*d*).

As shown in Embodiment 1, with regards to the appliance characteristic code sequence when the hand is released from the knob immediately after ignition and the pilot burner is OFF, [08131] is extracted from a code sequence [0861131111111111] of FIG. 5(*a*). Similarly, with regards to the appliance characteristic code sequence when the hand is released from the knob when some time has passed after ignition and the pilot burner is OFF, [08131] is extracted from a code sequence [0861113111111111] of FIG. 5(*c*). Since the appliances are the same, it is understood that the extracted appliance characteristic code sequences match each other.

With regards to the intermediate stable flow rate and the stable flow rate, as shown in FIG. 5(*a*), since codes are within a predetermined range, for example, codes equal to or smaller than 2 appear continuously the first predetermined number of times, for example, two times at the time 4 and the time 5 (a range indicated by (I)), the average value 165 L/h of the flow rate 167 L/h of the time 4 and the flow rate 163 L/h of the time 5 is stored as an intermediate stable flow rate. Thereafter, after the pilot burner is OFF and the flow rate decreases, codes are equal to or smaller than 2 from the time 7 and continuous the second predetermined number of times, for example, four times (a range indicated by (II)), the average value 142.75 L/h of the flow rate 143 L/h of the time 7, the flow rate 142 L/h of the time 8, the flow rate 143 L/h of the time 9, and the flow rate 143 L/h of the time 10 is stored as a stable flow rate.

In FIG. 5(*c*), at the time 4 and the time 5, since codes are equal to or smaller than 2 and continuous two times, the average value 168 L/h of the flow rate 169 L/h of the time 4 and the flow rate 167 L/h of the time 5 is stored as an intermediate stable flow rate. Subsequently, since the codes are equal to or smaller than 2 to the time 7 and continuous four times from the time 4 to the time 7 (a range indicated by (III)), the average value 166.75 L/h of the flow rate 169 L/h of the time 4, the flow rate 167 L/h of the time 5, the flow rate 168 L/h of the time 6, and the flow rate 163 L/h of the time 7 is stored as a stable flow rate, and the intermediate stable flow rate calculated and stored from the flow rate of the time 4 and the flow rate of the time 5 is cleared.

Thereafter, the pilot burner is OFF and the flow rate decreases, such that codes are outside the predetermined range, and then the intrinsic stable flow rate representing the characteristics of the appliances appears. For this reason, monitoring further continues, and the stable flow rate is detected from the time 9 to the time 12 within a range indicated by (IV) of FIG. 5(*c*). Then, the stored stable flow rate 166.75 L/h is stored in the intermediate stable flow rate, and the average value 143 L/h of the flow rates from the time 9 to the time 12 is stored again as a stable flow rate.

Therefore, even when there are variations resulting from manual operation, it is possible to stably extract the characteristics of the appliances and to prevent erroneous determination.

In a gas appliance which automatically controls the gas flow rate, a stable flow rate may repeatedly appear depending on the usage environment, and in order to extract the characteristics specific to the appliances at the time of ignition, the number of appearances of the stable flow rate or a monitoring time may be restricted.

As described above, in this embodiment, even when there are variations resulting from manual operation or ignition state, it becomes possible to extract flow rates representing characteristics when the appliances are in operation and flow rates representing characteristics in a stable state, and to extract the stable characteristics of the appliances.

Embodiment 3

Figure 6:
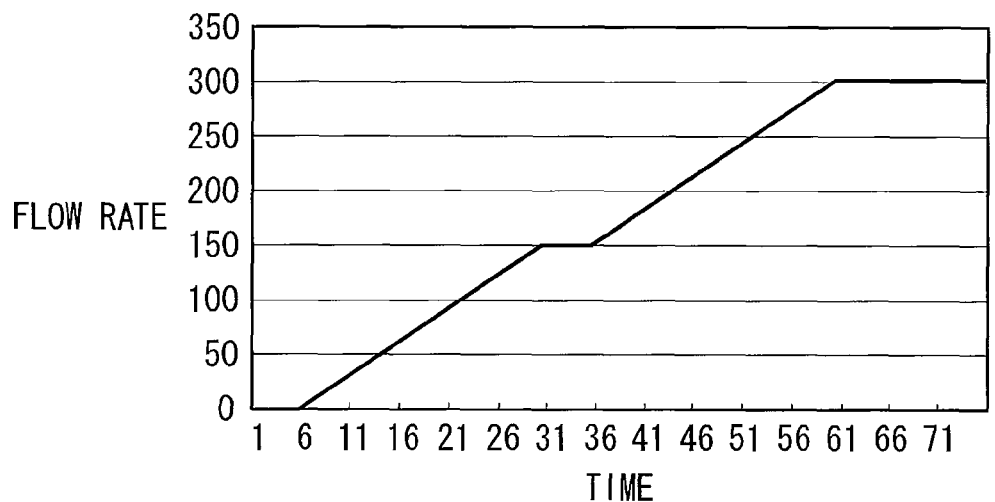
In FIG. 6, (a) is a graph showing a flow rate list when using a gas appliance D in Embodiment 3 of the invention, and (b) is a graph showing flow rate characteristics when using the gas appliance D.

FIGS. 6(a) and 6(b) are diagrams showing flow rate characteristics in Embodiment 3 of the invention. FIG. 6(a) shows a list of flow rates extracted at time intervals shorter than the measurement interval in a gas appliance D having the rise characteristics of the flow rates shown in FIG. 6(b). For example, it is assumed that the actual measurement interval is five times greater than the time interval shown in FIG. 6(a).

FIG. 7(a) shows the change in the flow rate and the ratio of a current flow rate and a previous flow rate in Measurement 1 to Measurement 5 with a shift in the measurement timing. For convenience, although at the time 1, the time 6, and the time 11 of FIG. 6(a), the flow rate for every five pieces of data extracted as a measured flow rate is described in "FLOW RATE" of Measurement 1 of FIG. 7(a). Similarly, the flow rate extracted from the time 2 of FIG. 6(a) is described in "FLOW RATE" of Measurement 2 of FIG. 7(a), the flow rate from the time 3 of FIG. 6(a) is described in "FLOW RATE" of Measurement 3 of FIG. 7(a), the flow rate extracted from the time 4 of FIG. 6(a) is described in "FLOW RATE" of Measurement 4 of FIG. 7(a), and the flow rate extracted from the time 5 of FIG. 6(a) is described in "FLOW RATE" of Measurement 5 of FIG. 7(a). FIGS. 7(b) and 7(f) are graphs showing the change in the flow rate represented in "FLOW RATE" of Measurements 1 to 5 described in the list of FIG. 7(a).

In the gas appliance D, while the characteristics of the flow rate of 150 L/h and 300 L/h are viewed from the graph of FIG. 6(b), for example, in FIG. 7(c) or 7(d), since it is unclear, and codes within a predetermined range do not appear continuously in the vicinity of 150 L/h, it is difficult to extract the intermediate stable flow rate.

Accordingly, when the flow rate measured by the flow rate measurement unit 104 is equal to or higher than a first predetermined flow rate, for example, 50 L/h and equal to or lower than a second predetermined flow rate, for example, 1000 L/h, the appliance characteristic extraction unit 214 calculates the ratio of the previous flow rate and the current flow rate. The first predetermined flow rate and the second predetermined flow rate are provided to prevent erroneous detection at the time of the start of rise in the flow rate resulting from the measurement timing or erroneous detection at the time of the change in the flow rate under control after a steep rise in a water heater.

Although the ratio (current flow rate/previous flow rate) of the current flow rate and the previous flow rate is 1 when the current flow rate and the previous flow rate are the same, the values in "RATIO" of FIG. 7(a) are calculated by the following expression.

ratio=(1−current flow rate/previous flow rate)×100

For convenience, the ratio is zero when the current flow rate and the previous flow rate are the same, and is expressed in percentage.

If the calculated ratio is within a predetermined ratio range, for example, within ±15%, the average flow rate of the current flow rate at that time and the previous flow rate is stored as an intermediate flow rate. As shown in FIG. 8, in "RATIO" of Measurement 1 of FIG. 7(a), the ratio is 4% at the time 8, and the average value 153 L/h of the flow rate 150 L/h of the time 7 as the previous flow rate and 156 L/h as the current flow rate is stored as an intermediate flow rate. Similarly, in "RATIO" of Measurement 2 of FIG. 7(a), the ratio is 13.6% at the time 7, and the average value 141.0 L/h of the flow rate 132 L/h of the time 6 and 150 L/h of the time 7 is stored as an intermediate flow rate. In "RATIO" of Measurement 3 of FIG. 7(a), the ratio is 8.7% at the time 7, and the average value 144.0 L/h of 138 L/h of the time 6 and 150 L/h of the time 7 is stored as an intermediate flow rate. In "RATIO" of Measurement 4 of FIG. 7(a), the ratio is 4.2% at the time 7, and the average value 147.0 L/h of 144 L/h of the time 6 and 150 L/h of the time 7 is stored as an intermediate flow rate. In "RATIO" of Measurement 5 of FIG. 7(a), the ratio is 0.0% at the time 7, and the average value 150.0 L/h of 150 L/h of the time 6 and 150 L/h of the time 7 150.0 L/h is stored as an intermediate flow rate.

The intermediate flow rate varies from 141 L/h to 153 L/h, if the determination range for determining to be the same appliance is within the intermediate flow rate of a registered appliance ±10%, for example, even when the intermediate flow rate of the registered appliance is 141 L/h, the determination range is from 126.9 L/h to 155.1 L/h, and the determination range when the intermediate flow rate of the registered appliance is 153 L/h is from 137.7 L/h to 168.3 L/h. In both case, the intermediate flow rate is within the range, such that it is possible to determine to be the same appliance.

As described above, in this embodiment, it becomes possible to extract the flow rates representing the characteristics of the appliances which are hard to be clearly recognized due to the measurement timing, and to extract the stable characteristics of the appliances.

Embodiment 4

FIGS. 9(a) and 9(b) are diagrams showing a flow rate change and a ratio of a current flow rate and a previous flow rate in Measurement 1 to Measurement 5 with a shift in the measurement timing when using the gas appliance D in Embodiment 4 of the invention. The change in the flow rate at a time interval shorter than the measurement interval is as shown in FIGS. 6(a) and 6(b) in Embodiment 3, and thus description thereof will not be repeated.

When the flow rate measured by the flow rate measurement unit 104 is equal to or higher than a first predetermined flow rate, for example, 50 L/h and equal to or lower than a second predetermined flow rate, for example, 1000 L/h, the appliance characteristic extraction unit 214 calculates the ratio of the previous flow rate and the current flow rate. The first predetermined flow rate and the second predetermined flow rate are provided to prevent erroneous detection at the time of the start of rise in the flow rate resulting from the measurement timing or erroneous detection at the time of the change in the flow rate under control after a steep rise in a water heater.

Although the ratio (current flow rate/previous flow rate) of the current flow rate and the previous flow rate is 1 when the current flow rate and the previous flow rate are the same, the values in "RATIO" of FIG. 9(a) are calculated by the following expression.

ratio=(1−current flow rate/previous flow rate)×100

For convenience, the ratio is zero when the current flow rate and the previous flow rate are the same, and is expressed in percentage.

When the calculated ratio is within a predetermined ratio range, for example, within ±15%, the average flow rate of the current flow rate at that time and the previous flow rate is stored as an intermediate flow rate. For example, in Measurement 1 of FIG. 9(a), the ratio is 4.0% at the time 8, and the average value of 153 L/h of the flow rate 150 L/h of the time 7 and the flow rate 156 L/h of the time 8 is stored as an intermediate flow rate. Next, since the ratio is 19.2% at the time 9 and shifted from the predetermined ratio range of ±15%, subsequent monitoring of the intermediate flow rate is not performed.

Next, in Measurement 2 of FIG. 9(a), the ratio is 13.6% at the time 7, and the average value 141 L/h of the flow rate 132 L/h of the time 6 and the flow rate 150 L/h of the time 7 is stored as an intermediate flow rate. Next, since the ratio is 8.0% at the time 8 and closer to zero than the ratio at the time 7, the average value 156 L/h of the flow rate 150 L/h of the time 7 and the flow rate 162 L/h of the time 8 is stored again as an intermediate flow rate. Next, since the ratio is 18.5% at the time 9 and shifted from the predetermined ratio range of ±15%, subsequent monitoring of the intermediate flow rate is not performed.

For convenience, since the ratio is calculated such that the ratio is zero when the current flow rate and the previous flow rate are the same, when the ratio is close to zero, the intermediate flow rate is stored again. This is the same as a case where, when the ratio (current flow rate/previous flow rate) of the current flow rate and the previous flow rate is close to 1, the intermediate flow rate is stored again.

In Measurement 3 of FIG. 9(a), the ratio is 8.7% at the time 7, and the average value 144 L/h of the flow rate 138 L/h of the time 6 and the flow rate 150 L/h of the time 7 is stored as an intermediate flow rate. Next, since the ratio is 12.0% at the time 8 and within the predetermined ratio range of ±15%, but is not closer to zero than 8.7% at the time 7, the intermediate flow rate is not stored again, and subsequent monitoring of the intermediate flow rate is not performed.

The intermediate flow rate varies from 144 L/h to 156 L/h, if the determination range for determining to be the same appliance is within the intermediate flow rate of a registered appliance ±10%, for example, even when the intermediate flow rate of the registered appliance is 144 L/h, the determination range is from 129.6 L/h to 158.4 L/h, and the determination range when the intermediate flow rate of the registered appliance is 156 L/h is from 140.4 L/h to 171.6 L/h. In both case, the intermediate flow rate is within the range, such that it is possible to determine to be the same appliance.

As described above, in this embodiment, it becomes possible to extract the flow rates representing the characteristics of the appliances which are hard to be clearly recognized due to the measurement timing, and to extract the stable characteristics of the appliances.

Embodiment 5

Figure 10:
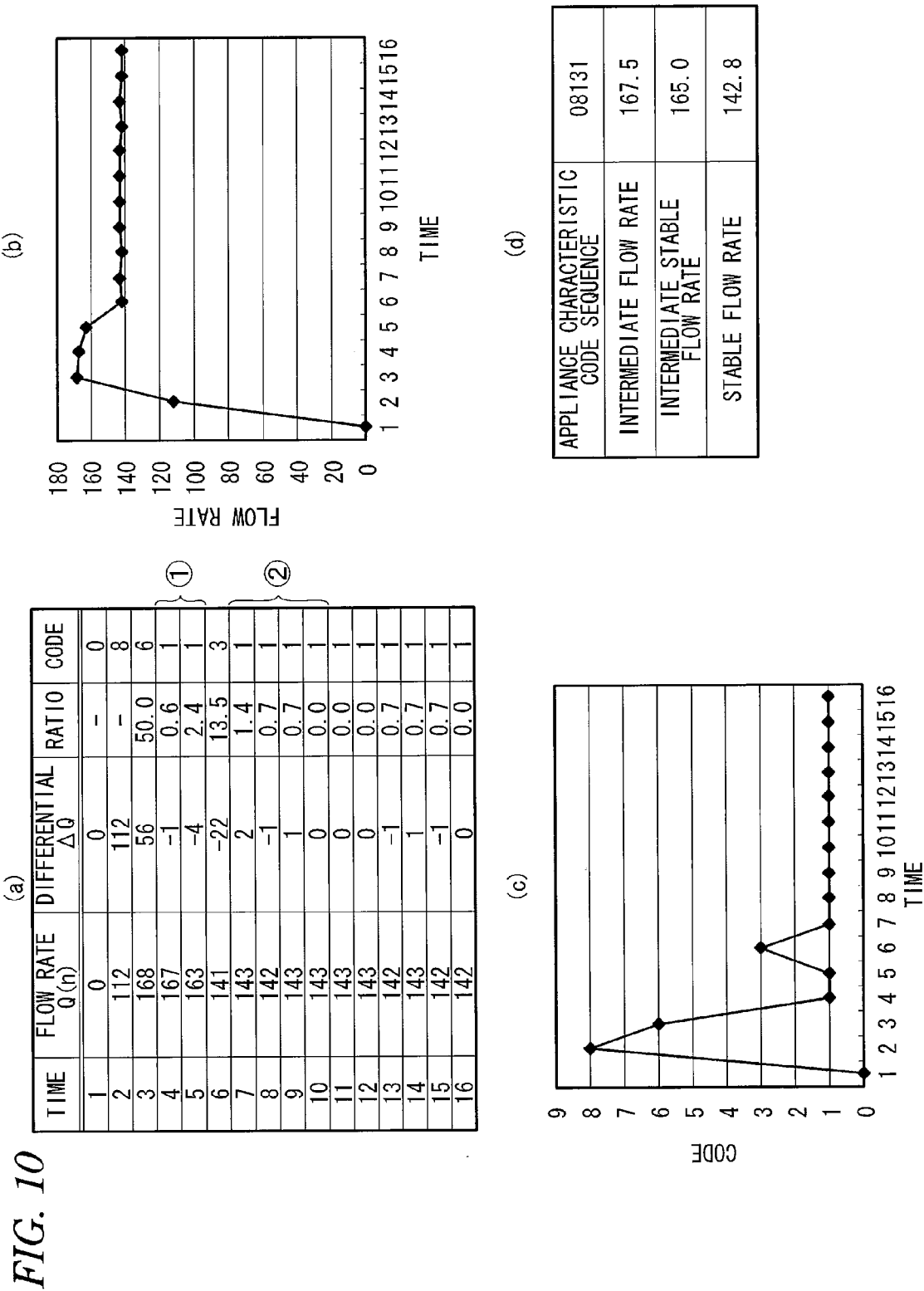
In FIG. 10, (a) is a diagram showing a concept of characteristic extraction when using a gas appliance C in Embodiment 5 of the invention, (b) is a graph showing flow rate characteristics when using the gas appliance C, (c) is a graph showing codes classified when using the gas appliance C, and (d) is a diagram showing a characteristic list extracted when using the gas appliance C.

FIGS. 10(a) to 10(d) are diagrams showing a concept of characteristic extraction in Embodiment 5 of the invention. FIG. 10(b) shows the rise characteristics of the flow rate at the time of ignition in the gas appliance C (for example, a press rotation-type hot plate equipped with a pilot burner, or the like) described in Embodiment 2. As shown in FIG. 10(d), the characteristics extracted by the appliance characteristic extraction unit 214 are an extracted code [08131], an intermediate flow rate of 167.5 L/h, an intermediate stable flow rate of 165.0 L/h, and a stable flow rate of 142.8 L/h.

FIGS. 11(a) to 11(d) shows a case when the pilot burner is OFF earlier than in FIGS. 10(a) to 10(d) in the same gas appliance C as in FIGS. 10(a) to 10(d). In FIG. 11(a), while the code becomes 1 at the time 4, the code is shifted from the predetermined range at the time 5 with a decrease in the flow rate when the pilot burner is OFF, such that no intermediate stable flow rate is detected. Thereafter, since codes are within a predetermined range and continuous two times at the time 6 and the time 7, an intermediate flow rate is detected and stored. Meanwhile, codes are subsequently within the predetermined range and continuous four times, such that a stable flow rate is detected and stored, and the stored intermediate stable flow rate is cleared. As a result, as shown in FIG. 11(d), the characteristics extracted by the appliance characteristic extraction unit 214 are an extracted code [08131], an intermediate flow rate of 167.5 L/h, no intermediate stable flow rate, and a stable flow rate of 142.25 L/h.

As shown in FIG. 12(a), the appliance identification unit 116 compares the extracted code, the intermediate stable flow rate, the stable flow rate, and the intermediate flow rate held in the appliance-specific characteristic information holding unit 218, that is, held as a registered appliance with the extracted code, the intermediate stable flow rate, the stable flow rate, and the intermediate flow rate extracted by the appliance characteristic extraction unit 214, that is, extracted as a used appliance. For example, when ±1 of the code, ±10% of the intermediate stable flow rate, ±10% of the stable flow rate, and ±10% of the intermediate flow rate held in the appliance-specific characteristic information holding unit 218 are set as determination values, if the extracted code, the intermediate stable flow rate, the stable flow rate, and the intermediate flow rate extracted by the appliance characteristic extraction unit 214 are within the determination values, it is determined to be the same appliance.

However, if the existence of the intermediate stable flow rate of FIG. 10(d) and the nonexistence of the intermediate stable flow rate of FIG. 11(d) is determined by the above-described determination method, in spite of the same gas appliance C, it may not be determined to be the same appliance. Accordingly, as shown in FIG. 12(b), when there is no intermediate stable flow rate as the appliance characteristics of the registered appliance and there is an intermediate stable flow rate in the used appliance, the intermediate flow rate of the registered appliance and the intermediate stable flow rate of the used appliance are compared. Similarly, as shown in FIG. 12(c), when there is the intermediate stable flow rate as the appliance characteristics of the registered appliance, and there is no intermediate stable flow rate in the used appliance, the intermediate stable flow rate of the registered appliance and the intermediate flow rate of the used appliance are compared. That is, when the appliance characteristics shown in FIG. 11(d) are held in the appliance-specific characteristic information holding unit 218, that is, held as the registered appliance, and the appliance characteristic extraction unit 214 extracts the characteristics shown in FIG. 10(d) as the used appliance, the extracted code, the intermediate flow rate, and the stable flow rate are within the determination values. Meanwhile, since there are no intermediate stable flow rates in the registered appliance, and there is the intermediate stable flow rate in the used appliance, the intermediate flow rate 167.5 L/h of the registered appliance and the intermediate stable flow rate 165.0 L/h of the used appliance are compared. Then, from the condition in which the intermediate stable flow rate 165.0 L/h of the used appliance is within ±10% of the intermediate flow rate 167.5 L/h of the registered appliance, it is possible to determine that the registered appliance and the used appliance are the same appliance.

Similarly, when the appliance characteristics shown in FIG. 10(d) are held in the appliance-specific characteristic information holding unit 218, that is, held as the registered appliance, and the appliance characteristic extraction unit 214 extracts the characteristics shown in FIG. 11(d) as the used appliance, the extracted code, the intermediate flow rate, and the stable flow rate are within the determination values. Meanwhile, since there is the intermediate stable flow rate in the registered appliance, and there is no intermediate stable flow rate in the used appliance, the intermediate stable flow rate 165.0 L/h of the registered appliance and the intermediate flow rate 167.5 L/h of the used appliance are compared. Then, from the condition in which the intermediate flow rate 167.5 L/h of the used appliance is within ±10% of the intermediate stable flow rate 165.0 L/h of the registered appliance, it is possible to determine that the registered appliance and the used appliance are the same appliance.

As described above, in this embodiment, it becomes possible to absorb variations resulting from the measurement timing, manual operation, or the like, and to improve appliance identification precision of the appliances.

Embodiment 6

FIGS. 13(a) and 13(b) are diagrams showing a flow rate change and the ratio of a current flow rate and a previous flow rate in Measurement 1 to Measurement 5 when using the gas appliance D in Embodiment 6 of the invention. The change in the flow rate at a time interval shorter than the measurement interval is as shown in FIGS. 6(a) and 6(b) in Embodiment 3, and description thereof will not be repeated.

The appliance characteristic extraction unit 214 detects the intermediate flow rates at the time 8 in Measurement 1 shown in FIG. 13(a), the time 8 in Measurement 2, the time 7 in Measurement 3, the time 7 in Measurement 4, and the time 7 in Measurement 5. As shown in FIG. 13(b), the intermediate flow rates at those times are 153.0 L/h in Measurement 1, 156.0 L/h in Measurement 2, 144 L/h in Measurement 3, 147.0 L/h in Measurement 4, and 150.0 L/h in Measurement 5. The average value of the intermediate flow rates is 150.0 L/h, and it is understood that the characteristic at a location of 150 L/h with no change in the flow rate is recognized halfway on the graph of the flow rate characteristics shown in FIG. 6(b).

When the characteristics match the characteristics of one of a plurality of appliances held in the appliance-specific characteristic information holding unit 218, and it is determined to be the same appliance, if the intermediate flow rate of the matched appliance is held in the appliance-specific characteristic information holding unit 218, the appliance identification unit 116 adds and holds the intermediate flow rate of the appliance extracted by the appliance characteristic extraction unit 214, and subsequently adds and holds the intermediate flow rate each time the appliance appears. If the appliance appears a predetermined number of times, the appliance identification unit 116 calculates the average value, and stores the calculated average value in the intermediate flow rate of the appliance held in the appliance-specific characteristic information holding unit 218.

That is, for example, Measurement 1 and Measurement 2 of FIG. 13(a) show the change in the flow rate when the measurement timing is shifted at a regular interval from the change of the rise in the flow rate of the gas appliance D shown in FIGS. 6(a) and 6(b). From the condition in which variations in the measurement timing are distributed evenly, the average value calculated by adding the intermediate flow rates approaches the flow rate representing the characteristic of the appliance without limit. The average value is stored again in the intermediate flow rate held in the appliance-specific characteristic information holding unit 218, thereby increasing precision of the intermediate flow rate representing the characteristic of the appliance.

The same process is performed with the intermediate stable flow rate or the stable flow rate as well as the intermediate flow rate to absorb variations in the flow rate, thereby increasing the flow rate precision.

When storing in the intermediate flow rate held in the appliance-specific characteristic information holding unit 218, if no intermediate stable flow rate is held, the same average value may be stored in the intermediate stable flow rate.

As described above, in this embodiment, it is possible to absorb variations in the appliance characteristic flow rate resulting from the measurement timing, to achieve high precision, and to improve appliance identification precision of the appliances.

Embodiment 7

Figure 14:
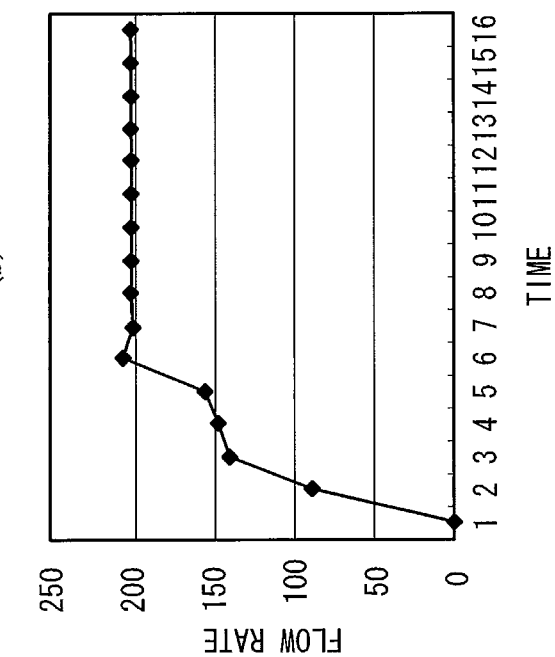
In FIG. 14, (a) is a diagram showing a concept of characteristic extraction when using a gas appliance A in Embodiment 7 of the invention, (b) is a graph showing flow rate characteristics when using the gas appliance A, and (c) is a diagram showing a characteristic list extracted when using the gas appliance A.

FIGS. 14(a) to 14(c) are diagrams showing a concept of characteristic extraction when using the gas appliance A in Embodiment 7 of the invention. FIGS. 15(a) to 15(c) are diagrams showing a concept of characteristic extraction when using the gas appliance C in Embodiment 7 of the invention.

As shown in FIG. 14(a), the appliance characteristic extraction unit 214 extracts [07151] from a code sequence [07611511111111111] as an appliance characteristic code sequence. At the time 4 and the time 5, since a predetermined range (for example, codes equal to or smaller than 2) is continuous a first predetermined number of times (for example, two times), 154 L/h is extracted as an intermediate stable flow rate. From the time 7 to the time 10, since the predetermined range (for example, codes equal to or smaller than 2) is continuous a second predetermined number of times (for example, four times), 203.75 L/h is extracted as a stable flow rate. At the time 4, since the ratio is within a predetermined ratio range (for example, ±15%), 147.5 L/h is extracted as an intermediate flow rate. FIG. 14(c) shows an extracted list.

Similarly, as shown in FIG. 15(a), [08131] is extracted from a code sequence [08611311111111111] as an appliance characteristic code sequence.

At the time 4 and the time 5, since the predetermined range (for example, codes equal to or smaller than 2) is continuous the first predetermined number of times (for example, two times), 165 L/h is extracted as an intermediate stable flow rate. From the time 7 to the time 10, since the predetermined range (for example, codes equal to or smaller than 2) is continuous the second predetermined number of times (for example, four times), 142.75 L/h is extracted as a stable flow rate. At the time 4, since the ratio is within the predetermined ratio range (for example, ±15%), 167.5 L/h is extracted as an intermediate flow rate. FIG. 15(c) shows an extracted list.

Next, characteristic extraction when the gas appliance C shown in FIGS. 15(a) to 15(c) starts to be used after the gas appliance A shown in FIGS. 14(a) to 14(c) starts to be used will be described.

FIGS. 16(a) to 16(c) are diagrams showing a concept of characteristic extraction when the gas appliance C starts to be used after the gas appliance A starts to be used.

As shown in FIG. 16(a), if the gas appliance C starts to be used after the gas appliance A starts to be used, the flow rate increases at the time 16. That is, from the time 1 to the time 15 indicated by (I) of FIG. 16(a), when the gas appliance A is used alone, and from the time 16 to the time 30 indicated by (II) of FIG. 16(a), the gas appliance A and the gas appliance C are used in combination. As indicated by (I) of FIG. 16(a), the appliance characteristic extraction unit 214 extracts [07151] from the code sequence [07611511111111111] as an appliance characteristic code sequence. At the time 4 and the time 5, since the predetermined range (for example, codes equal to or smaller than 2) is continuous the first predetermined number of times (for example, two times), 154 L/h is extracted as an intermediate stable flow rate. From the time 7 to the time 10, since the predetermined range (for example, codes equal to or smaller than 2) is continuous the second predetermined number of times (for example, four times), 203.75 L/h is extracted as a stable flow rate. At the time 4, since the ratio is within the predetermined ratio range (for example, ±15%), 147.5 L/h is extracted as an intermediate flow rate. When the gas appliance C indicated by (II) of FIG. 16(a) is used, codes obtained by the differential conversion unit 112 are converted from the differentials of the current flow rate and the previous flow rate, and the current flow rate and the previous flow rate both include the flow rate of the gas appliance A. If the flow rate of the gas appliance A is constant, when calculating the differential, the flow rate of the gas appliance A cancels and is converted as the code of the gas appliance C. Meanwhile, since the flow rate of the gas appliance A is added to the intermediate stable flow rate, the stable flow rate, and the intermediate flow rate, it is difficult to extract the characteristics as the gas appliance C. Accordingly, when codes within a second predetermined range (for example, equal to or smaller than 1) from among codes obtained by the differential conversion unit 112 appear continuously a third predetermined number of times (for example, five times), the average value of the flow rates until the third predetermined number of times is continuous is stored as an offset flow rate, and when extracting one of the intermediate stable flow rate, the stable flow rate, and the intermediate flow rate of the extracted appliance characteristic flow rates, a differential flow rate obtained by subtracting the offset flow rate from the extracted appliance characteristic flow rate is stored. For example, from the time 7 to the time 11 shown in FIG. 16(a), since codes equal to or smaller than 1 appear continuously five times, the average value 203.8 L/h of the flow rate 203 L/h of the time 7, the flow rate 204 L/h of the time 8, the flow rate 204 L/h of the time 9, the flow rate 204 L/h of the time 10, and the flow rate 204 L/h of the time 11 is stored as an offset flow rate (stored at the timing of an A point in FIG. 16(b)).

Thereafter, at the time 18 and the time 19 shown in FIG. 16(a), since the predetermined range (for example, codes equal to or smaller than 2) is continuous the first predetermined number of times (for example, two times), the differential flow rate 165.2 L/h between the average value 369 L/h of the flow rate 371 L/h of the time 18 and the flow rate 367 L/h of the time 19 and the offset flow rate 203.8 L/h is stored as an intermediate flow rate.

Although the value obtained by subtracting the offset flow rate from the average value of the flow rate of the time 18 and the flow rate of the time 19 is stored as an intermediate flow rate, even when the average value of the flow rate obtained by subtracting the offset flow rate from the flow rate of the time 18 and the flow rate obtained by subtracting the offset flow rate from the flow rate of the time 19 is calculated, the same result is obtained.

Similarly, from the time 21 to the time 24 shown in FIG. 16(a), since the predetermined range (for example, codes equal to or smaller than 2) is continuous the second predetermined number of times (for example, four times), the differential flow rate 142.95 L/h between the average value 346.75 L/h of the flow rates from the time 21 to the time 24 and the offset flow rate 203.8 L/h is stored as a stable flow rate.

Although the value obtained by subtracting the offset flow rate from the average value of the flow rates from the time 21 to the time 24 is stored as a stable flow rate, even when the average value of the flow rates obtained by subtracting the offset flow rate from the flow rates of the time 21 to the time 24 is calculated, the same result is obtained.

Similarly, at the time 18 shown in FIG. 16(a), since the ratio is within the predetermined ratio range (for example, ±15%), the differential flow rate 167.7 L/h between the average value 371.5 L/h of the flow rate 372 L/h of the time 17 and the flow rate 371 L/h of the time 18 as an intermediate flow rate and the offset flow rate 203.8 L/h is stored as an intermediate flow rate.

Although the value obtained by subtracting the offset flow rate from the average value of the flow rate of the time 17 and the flow rate of the time 18 is stored as an intermediate flow rate, even when the average value of the flow rate obtained by subtracting the offset flow rate from the flow rate of the time 17 and the flow rate obtained by subtracting the offset flow rate from the flow rate of the time 18 is calculated, the same result is obtained.

With regards to the ratio of the flow rate, since there is an influence of one appliance when the appliances are used in combination, when calculating the ratio, the current flow rate and the previous flow rate are also calculated using the flow rate obtained by subtracting the offset flow rate. The values in "RATIO" of FIG. 16(a) are calculated by the following expression.

$$\text{ratio}=(1-(\text{current flow rate-offset flow rate})/(\text{previous flow rate-offset flow rate}))\times 100$$

With regards to the appliance characteristics of the gas appliance A and the gas appliance C indicated by (I) and (II) of FIG. 16(c), by comparing the characteristics between when the gas appliance A shown in FIG. 14(c) is used alone and when the appliance C shown in FIG. 15(c) is used alone, it is understood that the characteristics are sufficiently extracted even when the appliances are used in combination, thereby identifying the appliances when the appliances are used in combination.

When another gas appliance is used while the gas appliance A is being used, and the extracted appliance characteristics match the gas appliance A, it is understood that there are at least two gas appliances (for example, fan heater) of the same kind as the gas appliance A at home.

Next, a case where the flow rate changes upon appliance flow rate control or the like will be described.

Figure 17:
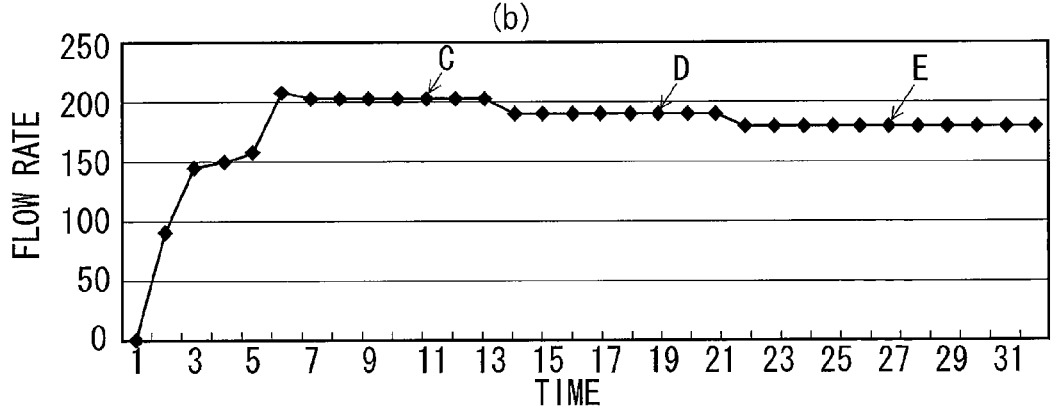
In FIG. 17, (a) is a diagram showing a concept of offset flow rate calculation upon flow rate control of a gas appliance A in Embodiment 7 of the invention, and (b) is a graph showing flow rate characteristics upon flow rate control of the gas appliance A.

FIGS. 17(a) and 17(b) are diagrams showing a concept of offset flow rate calculation upon flow rate control when using the gas appliance A.

As shown in FIG. 17(a), when the flow rate changes upon control or the like after the gas appliance A starts to be used, that is, when codes obtained by the differential conversion unit 112 are within a second predetermined range (for example, equal to or smaller than 1) and continuous the third predetermined number of times (for example, five times) after codes obtained by the differential conversion unit 112 change outside the second predetermined range (for example, equal to or smaller than 1), the appliance characteristic extraction unit 214 stores again the average value of the flow rates until the third predetermined number of times is continuous as an offset flow rate. In FIG. 17(a), since codes are 1 and continuous five times from the time 7 to the time 11, the average value 203.8 L/h of the flow rates from the time 7 to the time 11 is stored as an offset flow rate (stored at the timing of a C point in FIG. 17(b)). Thereafter, since the code is 2 at the time 14, and the codes are 1 and continuous five times from the time 15 to the time 19, the average value 189.6 L/h of the flow rates from the time 15 to the time 19 is stored again as an offset flow rate (stored at the timing of a D point in FIG. 17(b)). Similarly, since the code is 2 at the time 22, and the codes are 1 and continuous five times from the time 23 to the time 27, the average value 189.6 L/h of the flow rates from the time 23 to the time 27 is stored again as an offset flow rate (stored at the timing of an E point in FIG. 17(b)).

If the offset flow rate is updated, even when another appliance is used after the flow rate changes upon control or the like, it is possible to correctly identify another appliance.

As described above, in this embodiment, it becomes possible to extract the characteristics of the appliances when the appliances are used in combination in the same manner as when the appliances are used alone, and to improve appliance identification precision of the appliances.

Embodiment 8

Figure 18:
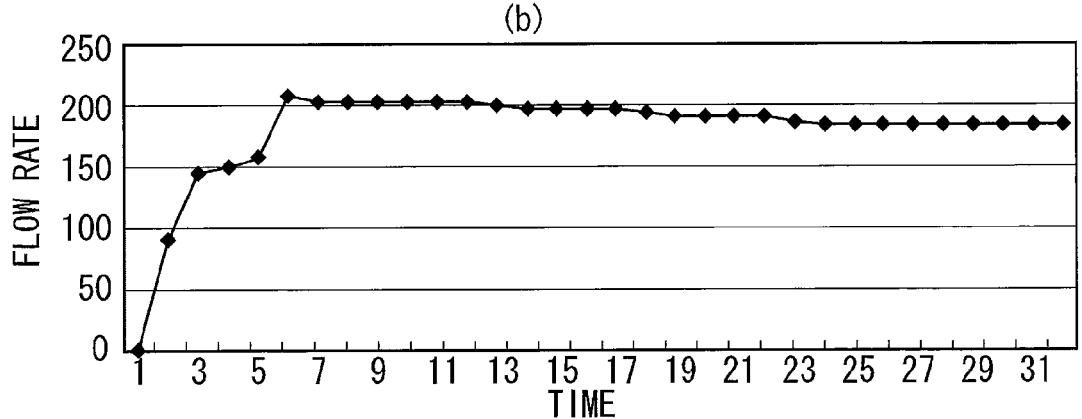
In FIG. 18, (a) is a diagram showing a concept of offset flow rate calculation upon the change in the flow rate of a gas appliance A changes in Embodiment 8 of the invention, and (b) is a graph showing flow rate characteristics upon the change in the flow rate of the gas appliance A.
Figure 19:
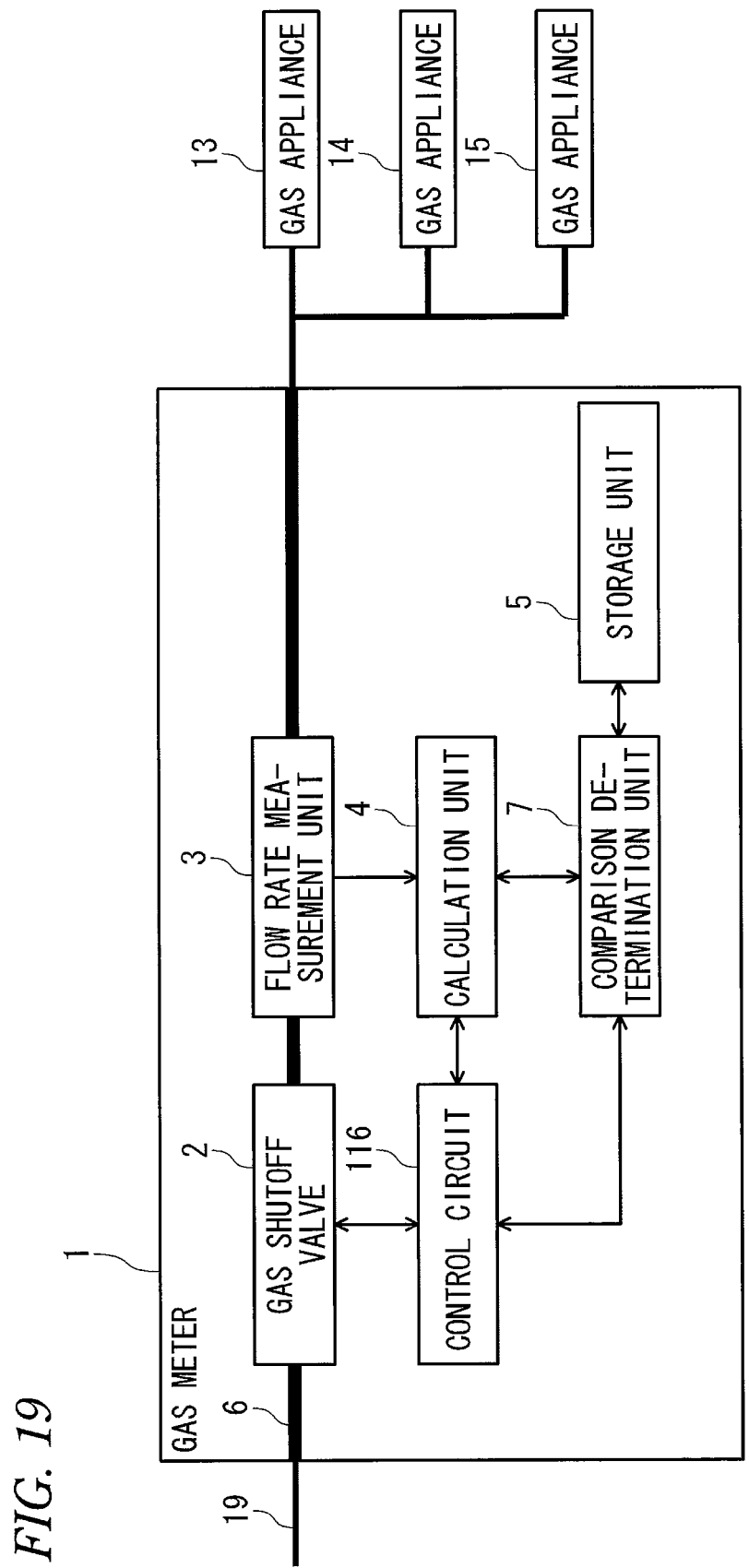
FIG. 19 is a block diagram of a gas meter of the related art.
Figure 20:
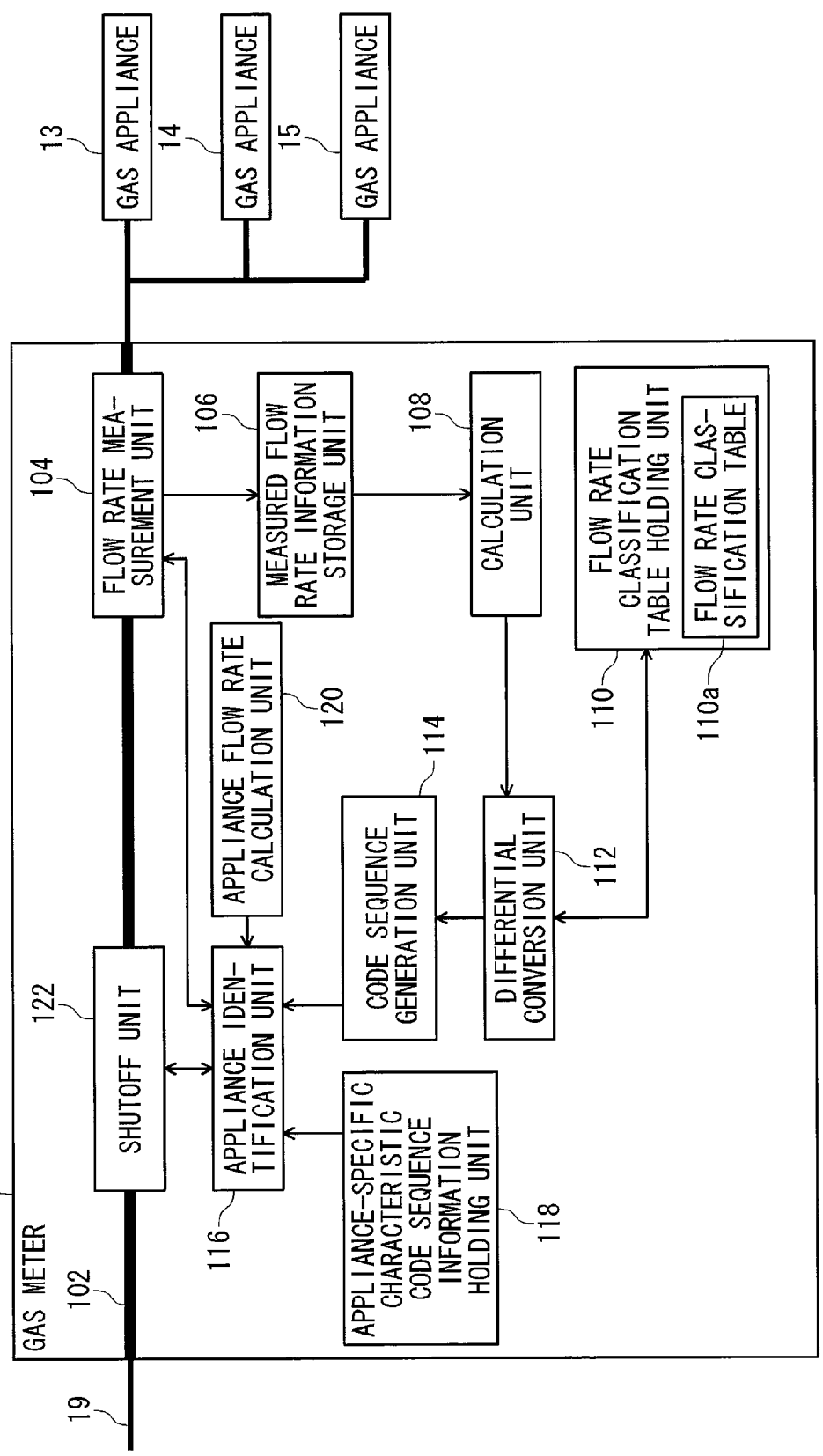
FIG. 20 is a block diagram of a flow rate measurement device of the related art.

FIGS. 18(a) and 18(b) are diagrams showing a concept of offset flow rate calculation upon the change in the flow rate of the gas appliance A in Embodiment 8 of the invention.

From the time 7 to the time 11 shown in FIG. 18(a), since codes obtained by the differential conversion unit 112 are within a second predetermined range (for example, equal to or smaller than 1) and continuous a third predetermined number of times (for example, five times), the appliance characteristic extraction unit 214 stores the average value 203.8 L/h of the flow rates from the time 7 to the time 11 as an offset flow rate. Next, from the condition in which the code is also 1 and within the second predetermined range at the time 12, the average value 204.0 L/h of the flow rates from the time 8 to the time 12 is stored again as an offset flow rate. Similarly, from the condition in which the code is also 1 and within the second predetermined range at the time 13, the average value 203.2 L/h of the flow rates from the time 9 to the time 13 is stored again as an offset flow rate. Subsequently, when codes within the second predetermined range appear continuously, the average value of the flow rates for the third predetermined number of times (for example, five times) is stored again as an offset flow rate.

Accordingly, for example, even when a gas appliance on the upstream side of the flow rate measurement device, and the flow rate changes, the offset flow rate is updated. Therefore, even when another appliance is used subsequently, it is possible to correctly identify another appliance.

In order to reduce the influence of gentle pulsation or the like and to improve precision, when codes within the second predetermined range appear continuously, for example, a fourth predetermined number of times is provided. Then, until the fourth predetermined number of times is reached, the average value of the flow rates until then may be stored as an offset flow rate. After the fourth predetermined number of times has been reached, the average value of the flow rates for the fourth predetermined number of times may be stored as an offset flow rate.

As described above, in this embodiment, it is possible to achieve high precision of the appliance characteristic flow rates to be extracted, and to improve appliance identification precision of the appliances.

In order to execute the appliance characteristic extraction method or the appliance determination method described above, a program for executing the respective steps is stored in the appliance characteristic extraction unit 214 or the appliance identification unit 116 of the gas meter 100, or a computer (not shown) (calculation device). Meanwhile, hardware, instead of the program, may also be used for the execution.

Although in the foregoing embodiments, a case where an ultrasonic flowmeter is used as the flow rate measurement unit has been described, even in another type of instantaneous flow rate measurement device which uses a sampling signal, it is obvious that the same effects are obtained. Although description of the processes after appliance identification is omitted, it is obvious in the gas meter that an appliance specific charge based on the measurement of the integrated flow rate for each registered appliance or each classified group may be set, and that an appliance specific security function for safety control (security function) for each registered appliance or each classified group may be set. If a transmitting and receiving unit, such as a wireless device, may be mounted in a gas meter and a gas appliance, it is obvious that the precision of appliance identification is improved.

Although in the foregoing embodiments, the appliance characteristic extraction using codes converted from flow rate differentials at regular time intervals has been described, more accurate characteristic extraction may be performed using the flow rate differentials.

In the foregoing embodiments, with regards to an appliance-specific characteristic code sequence or an appliance-specific characteristic flow rate, actual flow rate measurement is repeated, and correction is made taking into consideration variations. An appliance registration mode may be provided, an appliance may be repeatedly operated on site, the appliance characteristic may be extracted and averaged, and the characteristic may be registered as an appliance-specific characteristic code sequence or an appliance-specific characteristic flow rate. An appliance-specific characteristic code sequence or an appliance-specific characteristic flow rate may be registered automatically by learning without setting an appliance-specific characteristic code sequence or an appliance-specific characteristic flow rate in advance.

Although various embodiments of the invention have been described, the invention is not limited to the embodiments, and the invention will also be subjected to various alterations or applications by those skilled in the art on the basis of the description of the specification and the well-known techniques without departing the spirit and scope of the invention. The alterations or modifications shall also fall within the range where protection of the present invention is sought.

Although the invention has been described in detail or in connection with specific examples, it is obvious to those skilled in the art that various changes or modifications may be made without departing from the spirit and scope of the invention.

This application is based on Japanese Patent Application No. 2009-251699 filed on Nov. 2, 2009, the content of which is incorporated herein by reference.

INDUSTRIAL APPLICABILITY

As described above, the flow rate measurement device according to the invention can extract characteristics of appliances, and can be thus applied for specifying a used appliance connected to the downstream side of the flow rate measurement device or grouping even in an industrial flowmeter or a water meter.

The invention claimed is:
1. A flow rate measurement device, comprising:
a flow rate measurement unit that is configured to measure a flow rate of a fluid flowing in a flow channel at a regular time interval;

a calculation unit that is configured to calculate differentials at regular time intervals in the flow rate measured by the flow rate measurement unit;
a flow rate classification table in which a plurality of differential classifications classified according to a magnitude of differentials are associated with codes representing the respective differential classifications;
a differential conversion unit that is configured to convert the differentials calculated by the calculation unit to the codes based on the flow rate classification table;
an appliance characteristic extraction unit that is configured to generate an appliance characteristic code sequence representing a characteristic of an appliance from the codes obtained at regular time intervals by the differential conversion unit or extract a plurality of appliance characteristic flow rates representing characteristics of appliances from the flow rate measured by the flow rate measurement unit; and
an appliance identification unit that is configured to compare at least either the appliance characteristic code sequence extracted by the appliance characteristic extraction unit with appliance-specific characteristic code sequences representing characteristic code sequences specific to appliances held in an appliance-specific characteristic information holding unit, or the plurality of appliance characteristic flow rates extracted by the appliance characteristic extraction unit with a plurality of appliance-specific characteristic flow rates representing characteristic flow rates specific to appliances held in the appliance-specific characteristic information holding unit so as to identity the appliance, wherein
when codes within a predetermined range from among the codes obtained by the differential conversion unit appear continuously a first predetermined number of times, the appliance characteristic extraction unit stores an average value of flow rates until appeared continuously the first predetermined number of times as an intermediate stable flow rate of the appliance characteristic flow rates, and
when codes within the predetermined range from among the codes obtained by the differential conversion unit appear continuously a second predetermined number of times, the appliance characteristic extraction unit stores an average value of flow rates until appeared continuously the second predetermined number of times as a stable flow rate of the appliance characteristic flow rates.

2. The flow rate measurement device according to claim 1, wherein
when the codes within the predetermined range from among the codes obtained by the differential conversion unit appear continuously the first predetermined number of times, the appliance characteristic extraction unit stores the average value of the flow rates until appeared continuously the first predetermined number of times as the intermediate stable flow rate, then, when the codes within the predetermined range appearing continuously reach the second predetermined number of times, the appliance characteristic extraction unit stores the average value of the flow rates until appeared continuously the second predetermined number of times as the stable flow rate and delete the stored intermediate stable flow rate, and then,
when the codes within the predetermined range appear continuously the second predetermined number of times again after the codes obtained by the differential conversion unit are outside the predetermined range, the appliance characteristic extraction unit stores the stored stable flow rate again as a new intermediate stable flow rate and store an average value of the flow rates until appeared continuously the second predetermined number of times as a new stable flow rate.

3. The flow rate measurement device according to claim 1, wherein
the appliance characteristic extraction unit is configured to monitor the flow rate measured by the flow rate measurement unit, and
when the flow rate is equal to or higher than a first predetermined flow rate and equal to or lower than a second predetermined flow rate, the appliance characteristic extraction unit calculates a ratio between a previous flow rate and a current flow rate, and if the ratio is within a predetermined ratio range, the appliance characteristic extraction unit stores an average flow rate of the current flow rate and the previous flow rate at that time as an intermediate flow rate and stops monitoring the intermediate flow rate subsequently.

4. The flow rate measurement device according to claim 3, wherein
the appliance identification unit is configured to compare and determine the stable flow rates, the intermediate stable flow rates, and the intermediate flow rates between a plurality of appliance characteristic flow rates extracted by the appliance characteristic extraction unit and a plurality of appliance-specific characteristic flow rates held in the appliance-specific characteristic information holding unit,
when there is an intermediate stable flow rate among the appliance characteristic flow rates extracted by and held in the appliance characteristic extraction unit, and there is no intermediate stable flow rate and there is an intermediate flow rate among the appliance-specific characteristic flow rates held in the appliance-specific characteristic information holding unit, the appliance identification unit compares and determines the intermediate stable flow rate extracted by the appliance characteristic extraction unit and the intermediate flow rate held in the appliance-specific characteristic information holding unit, and
when there is no intermediate stable flow rate and there is an intermediate flow rate among the appliance characteristic flow rates extracted by and held in the appliance characteristic extraction unit, and there is an intermediate stable flow rate among the appliance-specific characteristic flow rates held in the appliance-specific characteristic information holding unit, the appliance identification unit compares and determines the intermediate flow rate extracted by the appliance characteristic extraction unit and the intermediate stable flow rate held in the appliance-specific characteristic information holding unit.

5. The flow rate measurement device according to claim 3, wherein
when the appliance identification unit has identified that a new appliance is the same as a previous appliance for which the intermediate flow rate is stored by comparing either the appliance characteristic code sequence extracted by the appliance characteristic extraction unit with the appliance-specific characteristic code sequence representing the characteristic code sequences specific to the appliance held in the appliance-specific characteristic information holding unit or the plurality of appliance characteristic flow rates extracted by the appliance characteristic extraction unit with the plurality of appliance-specific characteristic flow rates specific to the appliances held in the appliance-specific characteristic information holding unit, the appliance identification unit adds and holds the intermediate flow rate extracted by the appliance characteristic extraction unit when the appliance characteristic extraction unit has identified that new appliance is the same as the previous appliance for which the intermediate flow rate is stored among the plurality of appliance-specific characteristic flow rates specific to the appliances held in the appliance-specific characteristic information holding unit, and when the new appliance identified the same as the previous appliance appears a predetermined number of times, the appliance characteristic extraction unit calculates an average value of the added and held intermediate flow rates and stores the calculated average value in the intermediate flow rate of the appliance-specific characteristic flow rates held in the appliance-specific characteristic information holding unit.

6. The flow rate measurement device according to claim 1, wherein the appliance characteristic extraction unit is configured to monitor the flow rate measured by the flow rate measurement unit, and when the flow rate is equal to or higher than a first predetermined flow rate and equal to or lower than a second predetermined flow rate, the appliance characteristic extraction unit calculates a ratio between a previous flow rate and a current flow rate, and if the ratio is within a predetermined ratio range, the appliance characteristic extraction unit stores an average flow rate of the current flow rate and the previous flow rate at that time as an intermediate flow rate, and then, when the calculated ratio is closer to 1 than a previously calculated ratio is, the appliance characteristic extraction unit stores an average flow rate of the current flow rate and the previous flow rate at that time again as an intermediate flow rate, whereas when the calculated ratio is not closer to 1 than the previously calculated ratio is, and if the ratio is outside the predetermined ratio range or the flow rate exceeds the second predetermined flow rate, the appliance characteristic extraction unit stops monitoring the intermediate flow rate subsequently.

7. The flow rate measurement device according to claim 1, wherein when codes within a second predetermined range from among the codes obtained by the differential conversion unit appear continuously a third predetermined number of times, the appliance characteristic extraction unit stores an average value of flow rates until appeared continuously the third predetermined number of times as an offset flow rate, when one of the intermediate stable flow rate, the stable flow rate, and an intermediate flow rate of the extracted appliance characteristic flow rates is extracted, the appliance characteristic extraction unit stores a differential flow rate obtained by subtracting the offset flow rate from the extracted appliance characteristic flow rate, and after the codes obtained by the differential conversion unit are outside the second predetermined range, when the codes obtained by the differential conversion unit appear continuously the third predetermined number of times within the second predetermined range, the appliance characteristic extraction unit calculates and stores the offset flow rate.

8. The flow rate measurement device according to claim 7, wherein when the codes obtained by the differential conversion unit appear continuously within the second predetermined range even after the offset flow rate is stored, the appliance characteristic extraction unit stores an average value of the flow rates before the third predetermined number of times again as the offset flow rate.

9. A non-transitory computer-readable storage medium for storing a program which causes a computer to function as the flow rate measurement device as set forth in claim 1.

* * * * *